United States Patent
Tanaka et al.

(10) Patent No.: US 6,614,498 B1
(45) Date of Patent: Sep. 2, 2003

(54) LIQUID-CRYSTAL DISPLAY DEVICE AND ELECTRONIC EQUIPMENT

(75) Inventors: Chihiro Tanaka, Shimosuwa-machi (JP); Tadashi Tsuyuki, Shimosuwa-machi (JP); Yoshio Yamaguchi, Matsumoto (JP); Takeyoshi Ushiki, Shiojiri (JP); Takashi Inami, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/555,948

(22) PCT Filed: Oct. 5, 1999

(86) PCT No.: PCT/JP99/05489

§ 371 (c)(1),
(2), (4) Date: Jun. 6, 2000

(87) PCT Pub. No.: WO00/20918

PCT Pub. Date: Apr. 13, 2000

(30) Foreign Application Priority Data

Oct. 7, 1998 (JP) .................................. 10-285460
Oct. 7, 1998 (JP) .................................. 10-285461

(51) Int. Cl.$^7$ .............................................. G02F 1/133
(52) U.S. Cl. ................... 349/143; 349/145; 349/106; 349/108; 349/109
(58) Field of Search ............................... 349/144, 145, 349/146, 108, 109, 149, 49, 50, 51, 143, 106; 350/339; 345/92

(56) References Cited

U.S. PATENT DOCUMENTS 4,600,274 A * 7/1986 Morozumi .................. 350/339
6,011,532 A * 1/2000 Yanai et al. ................. 345/92

FOREIGN PATENT DOCUMENTS

| JP | 59-009636 | | 7/1982 |
| JP | 59-9636 A | | 1/1984 |
| JP | 59-9636 | | 1/1984 |
| JP | 59-61818 | | 4/1984 |
| JP | 3-212621 | | 1/1990 |
| JP | 3-212621 | | 9/1991 |
| JP | 403212621 A | * | 9/1991 |

OTHER PUBLICATIONS

Examination results from corresponding Japanese Application No. 11–562995.

* cited by examiner

Primary Examiner—Robert H. Kim
Assistant Examiner—Thoi Van Duong
(74) Attorney, Agent, or Firm—Harness, Dickey & Pierce, P.L.C.

(57) ABSTRACT

Color layers R, G, and B of a color filter are arranged in a delta pattern. A data line (212) for applying a voltage to the sub-pixels is connected, through TFD (220), to pixel electrodes (234) of the sub-pixels respectively corresponding to the three colors in a fixed order in a periodic pattern, and pixel electrodes (234) commonly connected to a single data line (212) are arranged to the same side of the data line (212). The potential of the sub-pixels for a particular color are equally influenced by the potential of the sub-pixels of other colors.

8 Claims, 23 Drawing Sheets

TYPE 3          LINE OF INTEREST

| SCANNING LINE NO. | LEFT LINE | | RIGHT LINE | DEGREE OF INFLUENCE |
|---|---|---|---|---|
| ① | 0 | 1 | 2 | +2 |
| ② | 0 | 2 | 1 | +1 |
| ③ | 1 | 2 | 0 | −1 |
| ④ | 2 | 1 | 0 | −2 |
| ⑤ | 1 | 2 | 0 | −1 |
| ⑥ | 0 | 2 | 1 | +1 |

(RANGE 4, MAXIMUM VARIATION 2)

TYPE 4          LINE OF INTEREST

| SCANNING LINE NO. | LEFT LINE | | RIGHT LINE | DEGREE OF INFLUENCE |
|---|---|---|---|---|
| ① | 0 | 1.5 | 1.5 | +1.5 |
| ② | 0 | 1.5 | 1.5 | +1.5 |
| ③ | 0 | 2 | 1 | +1 |
| ④ | 1.5 | 1.5 | 0 | −1.5 |
| ⑤ | 1.5 | 1.5 | 0 | −1.5 |
| ⑥ | 1 | 2 | 0 | −1 |

(RANGE 4, MAXIMUM VARIATION 2.5)

TYPE 5          LINE OF INTEREST

| SCANNING LINE NO. | LEFT LINE | | RIGHT LINE | DEGREE OF INFLUENCE |
|---|---|---|---|---|
| ① | 1 | 2 | 0 | −1 |
| ② | 1.5 | 1.5 | 0 | −1.5 |
| ③ | 1.5 | 1.5 | 0 | −1.5 |
| ④ | 2 | 1 | 0 | −2 |
| ⑤ | 1.5 | 1.5 | 0 | −1.5 |
| ⑥ | 1.5 | 1.5 | 0 | −1.5 |

(RANGE 1, MAXIMUM VARIATION 0.5)

*Fig. 5*

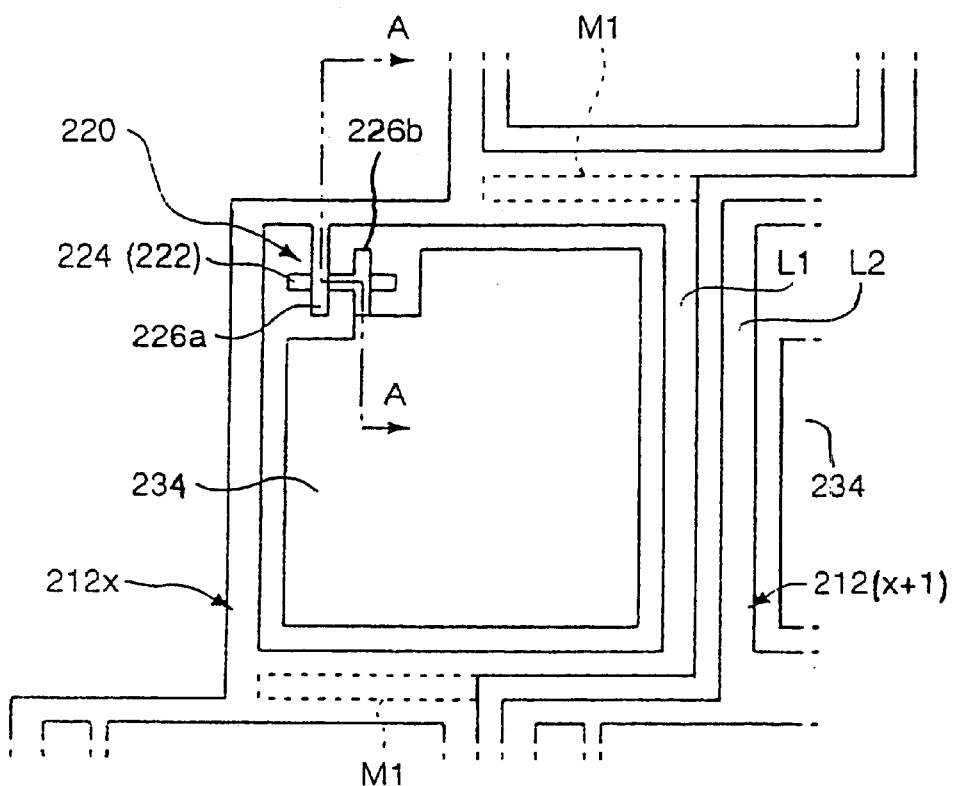
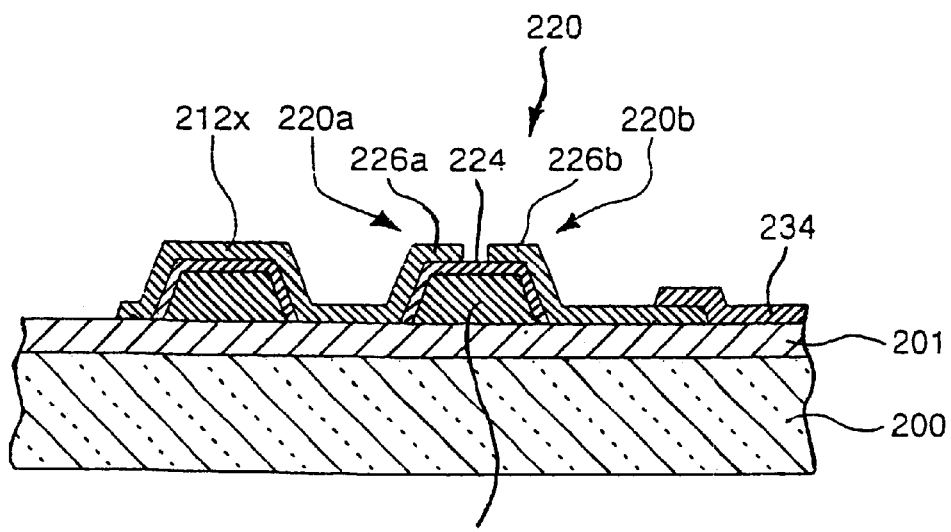
Fig. 8A
Fig. 8B (1)

(2)

(3)

(PLAN VIEW)

(4)

(5)

(6)

(SECTIONAL VIEW)

(PLAN VIEW)

(7)

(8)

(9)

( RGB STRIPE PATTERN )

( RGB MOSAIC PATTERN )

(RGGB MOSAIC PATTERN)

(RGB DELTA PATTERN)

LIQUID-CRYSTAL DISPLAY DEVICE AND ELECTRONIC EQUIPMENT

TECHNICAL FIELD

The present invention relates to a liquid-crystal display device having sub-pixels thereof, corresponding to three different colors and arranged in a delta pattern, and to electronic equipment incorporating the liquid-crystal display device.

BACKGROUND ART

Liquid-crystal display devices find widespread use in electronic equipment, such as small computers, digital cameras, and portable telephones. Such a liquid-crystal display device typically includes a pair of opposing substrates with a liquid crystal encapsulated therebetween, and electrodes formed on each of opposing surfaces of the substrates. The two electrodes and the liquid crystal sandwiched therebetween constitute pixels arranged in a matrix. When a voltage is selectively applied across the electrodes constituting the pixel, the liquid crystal changes its alignment, controlling the quantity of light transmitted therethrough, and thereby presenting a dot.

To present a color display in the liquid-crystal display device, one pixel is divided into three sub-pixels respectively corresponding to the primary colors of R (red), G (green), and B (blue). These sub-pixels placed in a predetermined pattern are arranged in a matrix. The coloring of each sub-pixel is typically performed through a color filter formed on one of the substrates.

Known as the arrangements of the color sub-pixels, i.e., the arrangement of color layers in the color filter in the liquid-crystal display device are an RGB stripe pattern shown in FIG. 15, an RGB mosaic pattern shown in FIG. 16, an RGGB mosaic pattern shown in FIG. 17, and an RGB delta pattern shown in FIG. 18. In these figures, "R", "G", and "B" represent colors provided by respective sub-pixels. Specifically, "R" represents red, "G" represents green, and "B" represents blue.

The RGB stripe pattern shown in FIG. 15, also called a trio pattern, is useful for presenting a data display for texts and lines. The resolution thereof is lower than those of other patterns.

The RGB mosaic pattern shown in FIG. 16 presents a difference in display quality between a rightward rising slant line and a leftward rising slant line, thereby generally presenting slant line noise over an entire image. Particularly, when the number of sub-pixels is small, the noise becomes conspicuous.

The RGGB mosaic pattern shown in FIG. 17 is said to present a high resolution because the number of "G" sub-pixels providing a high visibility is large. But the score through subjective assessment tests is not necessarily high. Furthermore, if a viewing distance is small, the coarseness of an image stands out, because the number of "B" and "R" sub-pixels is small.

The RGB delta pattern shown in FIG. 18 presents a horizontal resolution 1.5 times as good as that of the RGB mosaic pattern. The RGB delta pattern shown in FIG. 18 is said to have a drawback in the presentation of the outline of an image, compared with the RGGB mosaic pattern, because of a poor slant component of the resolution thereof. However, the subjective assessment tests give the highest score to the RGB delta pattern.

Given the same density of the sub-pixels, the comparison of the patterns shows that the RGB delta pattern providing a high horizontal resolution is considered as an adequate pattern for resulting in a high-definition and high-quality image.

The following two wiring patterns are known to connect sub-pixels to conductor lines (such as data lines or scanning lines) for driving the sub-pixels in the RGB delta pattern. Specifically, there are two wiring patterns: a wiring pattern (hereinafter referred to as a type 1) in which a single data line 212 is connected to the pixel electrodes 234 of two colors of the three sub-pixels of the three RGB colors as shown in FIG. 19, and a wiring pattern (hereinafter referred to as a type 2) in which each line is connected to the pixel electrode 234 of only a single color sub-pixel of the three RGB color sub-pixels as shown in FIG. 20. In these figures, the conductor line is a data line. As shown, a short line 220d, connecting each data line 212 to each pixel electrode 234, represents an active element, such as a TFT (Thin-Film Transistor) or a TFD (Thin-Film Diode).

In the type 1 wiring pattern (see FIG. 19), among the two sub-pixels for two colors sharing one data line 212, a variation in the potential of the sub-pixel for one color is affected by the potential of the sub-pixel for the other color. For this reason, a so-called vertical cross-talk occurs, and as a result, streak-like non-uniformity (sujimura in Japanese) occurs in a display screen. The display quality is thus degraded.

This problem is resolved by adopting the type 2 wiring pattern (see FIG. 20) in which one data line 212 handles one color. In the type 2 wiring pattern, however, if the potential of a data line 212 adjacent to a given sub-pixel varies, the potential of that sub-pixel also varies. For this reason, a so-called horizontal cross-talk occurs, creating a streak non-uniformity, and leading to a degradation in the display quality.

It is an object of the present invention to provide a liquid-crystal display device which achieves a high display quality by preventing the streak non-uniformity in the display screen arising from the vertical cross-talk and the streak non-uniformity in the display screen arising from the horizontal cross-talk, and to provide electronic equipment incorporating the liquid-crystal display device.

DISCLOSURE OF THE INVENTION

The streak non-uniformity is first discussed in detail before discussing the present invention.

Specifically, the streak non-uniformity in the display screen, arising from the vertical cross-talk in the type 1 wiring pattern shown in FIG. 19, is a phenomenon, which is that a dark row and a light row alternately occur every other row, when a single color pattern (solid pattern) of cyan, magenta, or yellow, i.e., respectively complementary color of "R", "G", or "B" is presented.

Now discussed is the liquid-crystal display device in a normally white mode with a white display (off) presented with no voltage applied. When a cyan display is presented, an "R" sub-pixel is in black (on), and a "G" sub-pixel and a "B" sub-pixel are in white (off). Data needs to be written to the "R" sub-pixels only.

In the type 1 wiring pattern, the data line is 212① is connected to the pixel electrodes 234 of the "R"0 and "G" sub-pixels, the data line 212② is connected to the pixel electrodes 234 of the "G" and "B" sub-pixels, and the data line 212③ is connected to the pixel electrodes 234 of the "B" and "R" sub-pixels.

The pixel electrode 234 of the "G" sub-pixel in the even rows are connected to the data line 212① only. When data is written to the "R" sub-pixels in the odd rows through the data line 212①, a difference between the potential of the "G" sub-pixels connected to the data line 212① and the potential of the data line 212① becomes large. For this reason, the potential of the "G" sub-pixels in the even rows is pulled to the writing potential to the "R" sub-pixels as shown in FIG. 21①. This is one type of vertical cross-talks.

Since the pixel electrodes 234 of the "G" sub-pixels in the odd rows are connected to only the data line 212② while the data line 212② is not connected to the "R" sub-pixels, a difference between the potential of the "G" sub-pixels connected to the data line 212② and the potential of the data line 212② remains small. For this reason, the potential of the "G" sub-pixels is almost unaffected by the writing voltage to the "R" sub-pixels as shown in FIG. 21②.

As a result, the root-mean-square value of the voltage applied to the "G" sub-pixels in the even rows becomes lower than the root-mean-square value of the voltage applied to the "G" sub-pixels in the odd rows. This leads to a phenomenon in which the "G" sub-pixels in the even rows are light while the "G" sub-pixels in the odd rows are dark. The same phenomenon occurs in the "B" sub-pixels as shown in FIG. 21③, in which the "B" sub-pixels in the even rows are dark while the "B" sub-pixels in the odd rows are light.

The light and dark portions alternate every row, causing the streak non-uniformity. The same is true when the yellow display and the magenta display are presented. The streak non-uniformity occurs with the odd row and the even row being dark and light.

FIG. 21①, FIG. 21②, and FIG. 21③ respectively show the potentials of video signals of the data lines 212①, 212②, and 212③ shown in FIG. 19 with the abscissa representing time, when a cyan solid pattern is presented. Although voltage modulation is applied to the video signal as shown, the same is conceptually true of a pulse width modulation (PWM), which is a standard driving method in the liquid-crystal display device employing TFD.

The vertical cross-talk is created because a single data line 212 is connected to the pixel electrodes 234 for the two color sub-pixels. Such a vertical cross-talk must be eliminated by adopting the type 2 wiring pattern shown in FIG. 20.

However, the type 2 wiring pattern has its own problem, i.e., the streak non-uniformity caused by the horizontal cross-talk. This problem is more pronounced when one of the complementary colors of "R", "G", and "B" (i.e., cyan, magenta, and yellow) is presented. Specifically, the streak non-uniformity attributed to the horizontal cross-talk is the phenomenon that the "G" sub-pixels in the odd rows are lighter than the "G" sub-pixels in the even rows while the "R" sub-pixels in the even rows are lighter than the "R" sub-pixels in the odd rows, when a yellow display is presented with the "B" sub-pixel in black (on) and the "R" and "G" sub-pixels in white (off) as shown in FIG. 20.

The inventors of this invention have studied the wiring pattern, and have observed that the streak non-uniformity attributed to the horizontal cross-talk is the phenomenon that the sub-pixels, surrounded by the data line 212⑤ (the data line connected to "B" sub-pixels) working to present a black display (namely, the "G" sub-pixels in the odd rows and the "R" sub-pixels in the even rows) are light while the sub-pixels surrounded by the data lines 212④ and 212⑥ not working to present a black display (namely, the "G" sub-pixels in the even rows and the "R" sub-pixels in the odd rows) are dark.

A macroscopical observation of the phenomenon shows that alternately appearing light vertical lines (GRGR) and dark vertical lines (RGRG) are recognized as vertical streaks. The inventors have also observed that the sub-pixels, surrounded by a data line working to write black data, appear light while the sub-pixels surrounded by a data line not working to write black data appear dark when the display color is changed to a cyan display (with the "R" sub-pixels in black) or a magenta display (with the "G" sub-pixels in black). Depending on the pitch of the sub-pixels, the same phenomenon can be recognized as a horizontal streak.

To further study the phenomenon, the inventors has measured the VT curves (voltage-transmittance characteristics) of the sub-pixel of interest with the conditions of the sub-pixels surrounding the sub-pixel of interest varied. FIG. 22 and FIG. 23 show the measurement results. FIG. 22 shows an off (white) waveform measured at a "G" sub-pixel positioned in an even row, and FIG. 23 shows an on (black) waveform measured at a "G" sub-pixel in an even row. These two figures show the variations in the waveforms of the "G" sub-pixels which are measured when the "R" sub-pixels and the "B" sub-pixels, adjacent to the "G" sub-pixels of interest, are changed between on (black) and off (white) displays.

From the VT curve shown in these figures, the voltage applied to the "G" sub-pixels in the even row tends to shift to a high voltage side regardless of the white or black state of the "B" sub-pixels, when the "R" sub-pixels are in black. When the "R" sub-pixels are in white, the voltage of the "G" sub-pixels tends to shift to a low voltage side. This tendency is pronounced in the off (white) waveforms shown in FIG. 22. This shift in optical characteristics agrees with the phenomenon observed through the naked eye. When V50 values (i.e., the voltage at a transmittance of 50%) are compared under conditions of R: white/B: white and R: black/B: black, a difference of 1.4 V is noticed in FIG. 22, and a difference of 1.8 V is noticed in FIG. 23.

These measurement results suggest that the wiring for driving a certain sub-pixel for one color (for instance, an "R" sub-pixel), routed around a sub-pixel (for instance, a "G" sub-pixel) adjacent to the "R" sub-pixel, creates a parasitic capacitance, causing a variation in the ratio of effective capacitances, and thereby leading to a shift of the voltage applied to the sub-pixel.

Referring to FIGS. 22 and 23, the reason why the VT curve of the "G" sub-pixels in the even row is controlled by the light state of the "R" sub-pixels is that a data line 212⑥ connected to the "R" sub-pixel is chiefly capacitively coupled with the "G" sub-pixels, and the voltage variation affects the voltage applied to the "G" sub-pixels. Since the lightness of the sub-pixel is affected from the sub-pixel adjacent thereto in row, this phenomenon is called a horizontal cross-talk.

When the wirings on the element side are data lines and the electrodes on the opposing substrate side (i.e., the color filter side) are scanning lines in the liquid-crystal display device employing TFD as an active element, a data line for driving one sub-pixel is present to one of the right and the left of the sub-pixel, and a data line for driving a sub-pixel for another color is present to the other of the right and the left of the sub-pixel. The horizontal cross-talk can therefore develop not only in the delta pattern but also in other patterns, such as a mosaic pattern and a stripe pattern.

The inventors have measured the VT curve for a sub-pixel in a liquid-crystal display device having color sub-pixels arranged in a mosaic pattern, given the same number and pitch of sub-pixels. The inventors have certainly observed that the voltage shift takes place as in the same way as in the delta pattern. The streak non-uniformity, which is observed as a serious problem in the delta pattern, is not problematic in the mosaic pattern. This is because there is no clear distinction between the odd rows and the even rows in the mosaic pattern, and the entire mosaic pattern is uniformly affected. The horizontal cross-talk therefore becomes conspicuous as a problem unique to the delta pattern.

In other words, the horizontal cross-talk observed in the delta pattern in the type 2 wiring pattern is basically unrelated to the arrangement of the color sub-pixels. The effect of the horizontal cross-talk, if uniformly distributed over the color sub-pixels, is not considered as a problem in the display. It is important that the colors of the sub-pixels driven by a wiring coupled with the sub-pixels be not alternated each row. Even if the effect of the horizontal cross-talk is uniform over all sub-pixels, the type 1 wiring pattern possibly presenting the vertical cross-talk as already discussed cannot be adopted.

In this situation, the inventors have studied a new wiring pattern in which the three color sub-pixels of "R", "G", and "B" are connected to a single data line in a delta pattern. We have contemplated three types, i.e., type 3 shown in FIG. 24, a type 4 shown in FIG. 25, and a type 5 shown in FIG. 1. We have assessed the degree of influence of coupling on the sub-pixel in each of the three types of the wiring patterns. FIG. 5 shows the assessment results.

In the assessment results, the degree of influence is "2" when the pixel electrode of a sub-pixel of interest is surrounded on half of the four sides thereof, "1.5" when the pixel electrode is surrounded in an L configuration of sides thereof, and "1" when a straight line (one side only) thereof is surrounded. Also in the assessment results, the influence of a data line (left line), positioned left to the pixel electrode of the sub-pixel of interest, is minus, while the influence of a data line (right line), positioned right thereto is plus. Also examined is not only a difference (range) between the minimum value and the maximum value of the degree of influence but also a maximum variation in the degree of influence during scanning period of adjacent sub-pixels.

In the type 3 wiring pattern shown in FIG. 24 and the type 4 wiring pattern shown in FIG. 25, the colors of sub-pixels driven by a data line coupled with the sub-pixels of one color change every six rows and are not desirable in view of the horizontal cross-talk, for the same reason why the type 2 wiring pattern (see FIG. 19) is not desirable.

The type 5 wiring pattern shown in FIG. 1 is most desirable in view of the assessment results of the degree of coupling influence and from the standpoint of prevention of the creation of cross-talk. A first invention relates to a liquid-crystal display device having sub-pixels respectively corresponding to three different colors and arranged in a triangular configuration. A conductor line for applying a voltage to these sub-pixels is connected to pixel electrodes of the sub-pixels for the three colors in a predetermined order in a periodic pattern, while pixel electrodes commonly connected to a single conductor line are arranged on the same side of the conductor line. In this arrangement, any given sub-pixel is connected to one of two conductor lines on both sides thereof, and each sub-pixel is coupled with the conductor line on only the other side thereof. When the same color sub-pixels in each row are observed, the colors of the sub-pixels driven by the data line coupled with the sub-pixels remain the same in each row. Since the effect of the horizontal cross-talk is uniform over all sub-pixels, the liquid-crystal display device is free from the streak non-uniformity and presents an excellent display quality.

In accordance with the first invention, the configuration of the conductor line surrounding the pixel electrode is different from row to row. If the distance between the conductor line and the pixel electrode adjacent thereto remains equal among rows, the coupling capacitance between the conductor line and the pixel electrode becomes different from row to row. In the first invention, the conductor line is a data line, and as the length of a portion of the data line extending along the pixel electrode gets longer, the distance between the data line and the pixel is preferably longer, or the data line is preferably narrower in width. In this arrangement, the coupling capacitance between the data line and the pixel electrode adjacent thereto is made uniform, and a display free from the streak non-uniformity thus results.

In accordance with the first invention, considering that the number of colors employed for the delta pattern is "3", the conductor lines are preferably connected to the pixel electrodes in a pattern which is periodically repeated with a multiple of six pixel electrodes.

In accordance with the first invention, the conductor line is preferably connected to the pixel electrode via an active element, and the active element is preferably fabricated of a thin-film diode having a conductor/insulator/conductor structure. With the active element, the sub-pixel to be on and the sub-pixel to be off are electrically isolated from each other. A uniform display image is thus obtained even when is used the thin-film diode, as the active element, which has difficulty forming a storage capacitor in parallel with the pixel electrode.

A second invention to achieve the above-described object relates to electronic equipment incorporating a liquid-crystal display device having sub-pixels respectively corresponding to three different colors and arranged in a triangular configuration. A conductor line for applying a voltage to these sub-pixels is connected to pixel electrodes of the sub-pixels for the three colors in a predetermined order in a periodic pattern, while pixel electrodes commonly connected to a single conductor line are arranged to the same side of the conductor line. The electronic equipment presents a good display free from the streak non-uniformity.

A third invention to achieve the above-described object relates to a liquid-crystal display device having sub-pixels respectively corresponding to three different colors arranged in a triangular configuration. Conductor line for applying a voltage to these sub-pixels has uniform parasitic capacitances thereof with the pixel electrodes of the sub-pixels.

Contemplated first to make uniform the parasitic capacitances with the electrodes of the sub-pixels is the arrangement in which the pixel electrode is surrounded by the conductor line connected thereto. In this arrangement, the data line coupled with the pixel electrode is only the one connected to the pixel electrode. In view of the uniform parasitic capacitance only, this arrangement is most desirable.

Contemplated second to make uniform the parasitic capacitances with the electrodes of the sub-pixels is the arrangement in which the periphery of the pixel electrode, other than a side facing an adjacent conductor line, is surrounded by the conductor line connected thereto with a spacing having a generally constant width thereacross. Although the liquid-crystal display device has one side of the pixel electrode coupled with the adjacent conductor line in this arrangement, the liquid-crystal display device has advantages of reducing the occurrence of short circuits in the manufacturing process thereof and of an increase in the aperture ratio thereof.

In accordance with the third invention, the conductor lines are preferably connected to the pixel electrodes in a pattern which is periodically repeated with a multiple of six pixel electrodes. This is because the number of colors employed for the delta pattern is "3" like in the first invention.

Like in the first invention, in the third invention, the conductor line is preferably connected to the pixel electrode via an active element, and the active element is preferably fabricated of a thin-film diode having a conductor/insulator/conductor structure.

A fourth invention to achieve the above-described object relates to electronic equipment incorporating the liquid-crystal display device having sub-pixels respectively corresponding to three different colors and arranged in a triangular configuration. A conductor line for applying a voltage to these sub-pixels has uniform parasitic capacitances thereof with the pixel electrodes of the sub-pixels. The electronic equipment thus presents a good display free from the streak non-uniformity.

BRIEF DESCRIPTION OF THE DRAWINGS

FIG. 5 shows tables listing the degree of influence of a coupling capacitor assessed in each row, between a data line and the pixel electrode of a sub-pixel, on the sub-pixel in wirings.

FIG. 8A is an enlarged view partially showing the layout of a single pixel in the liquid-crystal display device.

FIG. 8B is a cross-sectional view taken along line A—A in FIG. 8A.

BEST MODES FOR CARRYING OUT THE INVENTION

Figure 1:
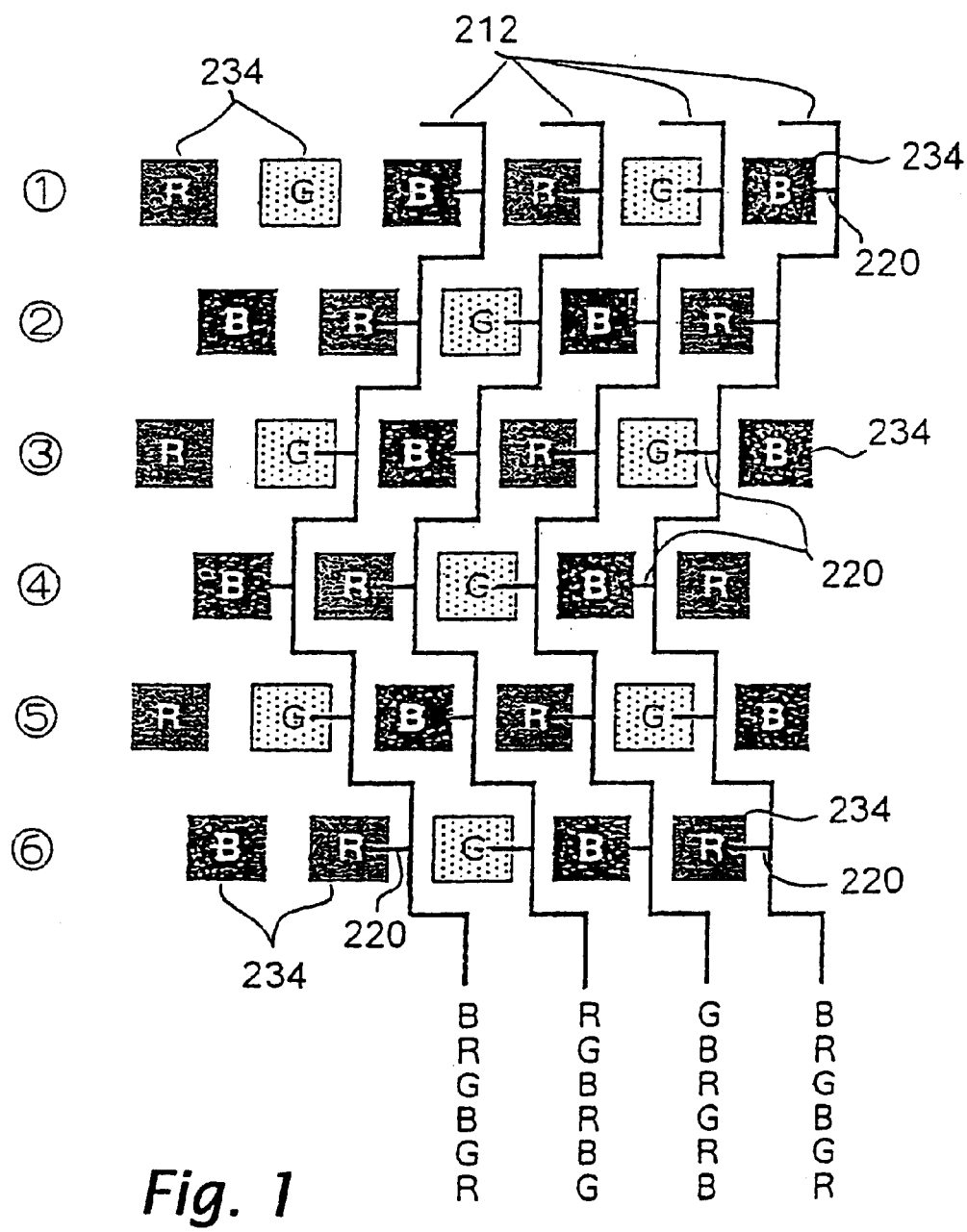
FIG. 1 is a plan view diagrammatically showing the wiring (type 5) to sub-pixels in a liquid-crystal display device of a first embodiment of the present invention.

The best modes for carrying out the present invention are now discussed, embodiment by embodiment, referring to the drawings.

First Embodiment

Figure 3:
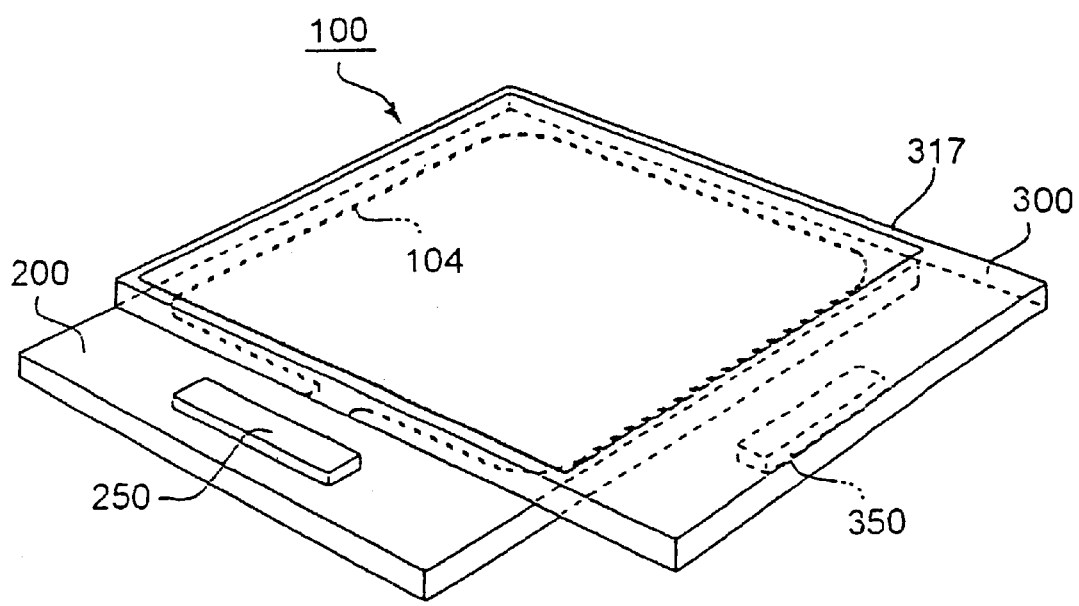
FIG. 3 is a perspective view showing the construction of the liquid-crystal display device.
Figure 4:
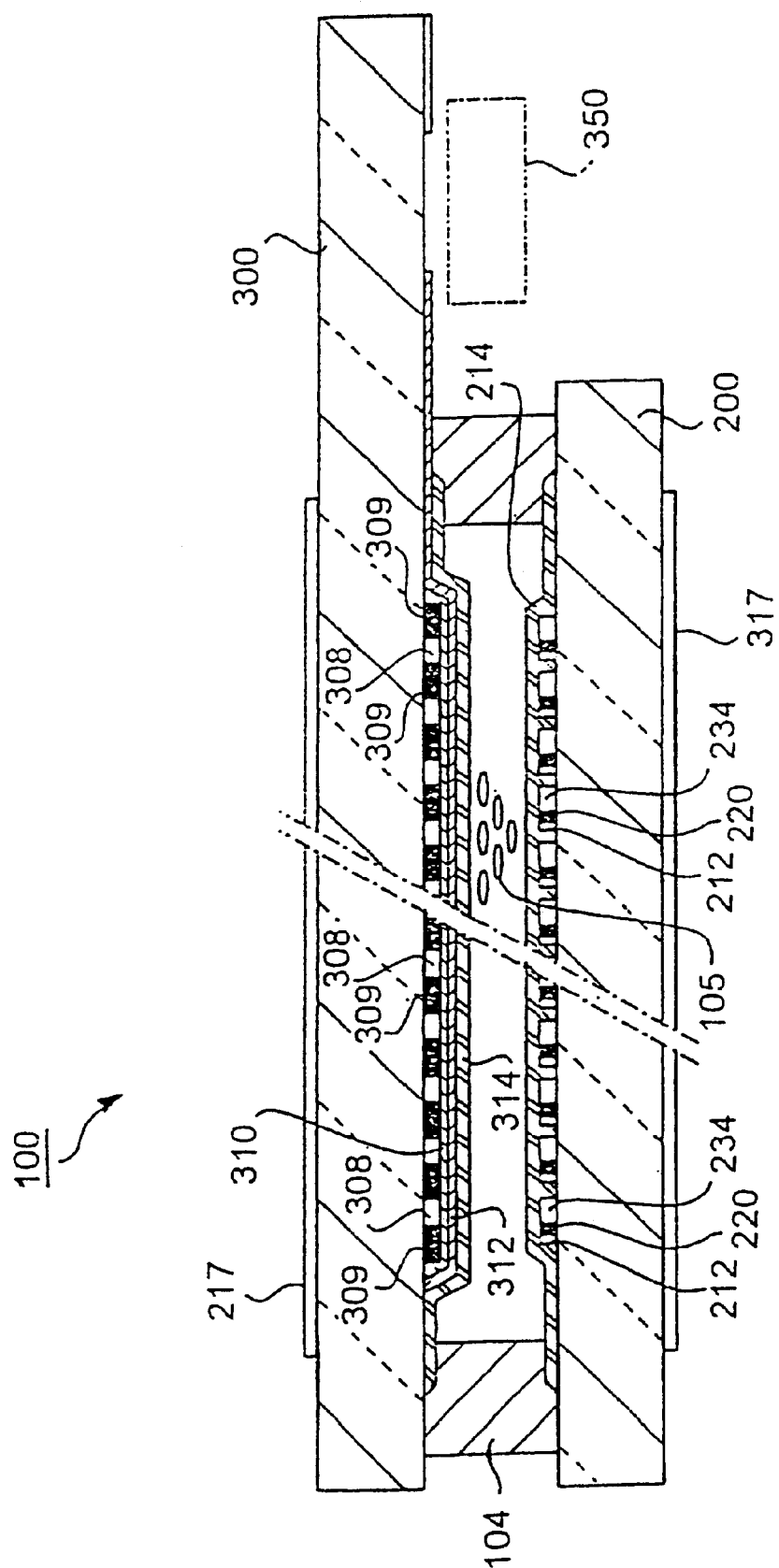
FIG. 4 is a cross-sectional view showing the construction of the liquid-crystal display device.

A liquid-crystal display device of a first embodiment of the present invention is now discussed, referring to FIG. 3 and FIG. 4. FIG. 3 is a perspective view showing the construction of the liquid-crystal display device of the present embodiment. FIG. 4 is a cross-sectional view showing the construction of liquid-crystal display device.

As shown, a liquid-crystal display device 100 includes a pair of light-transmissive substrates 200 and 300. The substrate 200 (element substrate) is a substrate on which active elements are formed, and the substrate 300 is a substrate opposing the element substrate 200.

As shown in FIG. 4, a plurality of data lines 212, a plurality of TFD 220 connected to the data lines 212, and pixel electrodes 234 connected to the TFD 220 in a one-to-one correspondence fashion, are formed on the inner surface of the element substrate 200, for instance through photo-lithographic technique. The data lines 212 (conductor line) extend perpendicular to a plane of the page as shown in FIG. 4, while TFD 220 and the pixel electrodes 234 are arranged in a dot matrix. An alignment layer 214, which has been subjected to a single axis alignment process, such as a rubbing process, is formed on the surface of the pixel electrodes 234.

A color filter 308 is formed on the inner surface of the opposing substrate 300, working as color layers for the three colors "R", "G", and "B". A black matrix 309 is formed between the three-color layers to block incident light through gaps between the color layers. An overcoat layer 310 is deposited on the color filter 308 and the black matrix 309, and opposing electrodes 312, working as scanning lines, are further formed in a direction perpendicular to the data lines 212, on the overcoat layer 310. The overcoat layer 310 serves the purpose of heightening the smoothness of the color filter 308 and the black matrix 309, and preventing the opening of the opposing electrodes 312. Arranged on the surface of the opposing electrodes 312 is an alignment layer 314, which has been subjected to a rubbing process. The alignment layers 214 and 314 are typically fabricated of polyimide.

The element substrate 200 and the opposing substrate 300 are attached together by a sealing material 104 with a constant gap maintained therebetween. A liquid crystal 105 is encapsulated into the gap between the two substrates. A polarizer 317, having an optical axis corresponding to the rubbing direction of the alignment layer 214, is glued onto the outer surface of the element substrate 200. Similarly, a polarizer 217, having an optical axis corresponding to the rubbing direction of the alignment layer 314, is glued on the outer surface of the opposing substrate 300.

The liquid-crystal display device 100 implements the COG (chip on glass) technology. Liquid-crystal driving IC (driver) 250 is directly mounted on the element substrate 200. As a result, output terminals of the liquid-crystal driving IC 250 are respectively connected to the data lines 212. Similarly, a liquid-crystal driving IC 350 is directly mounted on the surface of the opposing substrate 300, and output terminals of the liquid-crystal driving IC 350 are respectively connected to the opposing electrodes 212 as the scanning lines.

Instead of the COG technology, other technology may be used to connect the IC chip to the liquid-crystal display device. For instance, a TCP (Tape Carrier Package) having an IC chip bonded onto an FPC (Flexible Printed Circuit) may be electrically connected to the liquid-crystal display device using the TAB (Tape Automated Boding) technology. Alternatively, the COB (Chip On Board) technology may be used to bond an IC chip to a hard board.

TFD 220 and the pixel electrodes 234 are arranged in a dot matrix on the inner surface of the element substrate 200 as shown in FIG. 1. The pixel electrodes 234 are arranged to be shifted by 0.5 pitch every row (horizontal line). The opposing electrodes 312 formed on the inner surface of the opposing substrate 300 are positioned to face a row of pixel electrodes 234 formed on the element substrate 200. One color layer of the color filter 308 formed on the opposing substrate 300 is arranged where the pixel electrode 234 and the opposing electrode 312 are aligned with each other. A single sub-pixel is thus composed of a pixel electrode 234, an opposing electrode 312, a liquid crystal 105 encapsulated between the pixel electrode 234 and the opposing electrode 312, and one color layer of the color filter 308.

Referring to FIG. 1, a label "R" for a pixel electrode 234 means that the color layer transmitting red light therethrough is arranged in the color filter 308 formed on the opposing substrate 300 facing the pixel electrode 234. Similarly, "G" means that the color layer transmitting green light therethrough is arranged there, and "B" means that the color layer transmitting blue light therethrough is arranged there. In this embodiment, the color layers for "R", "G", and "B" are arranged in a triangular configuration, namely, in the apexes of a delta. An RGB delta pattern thus results.

Figure 2:
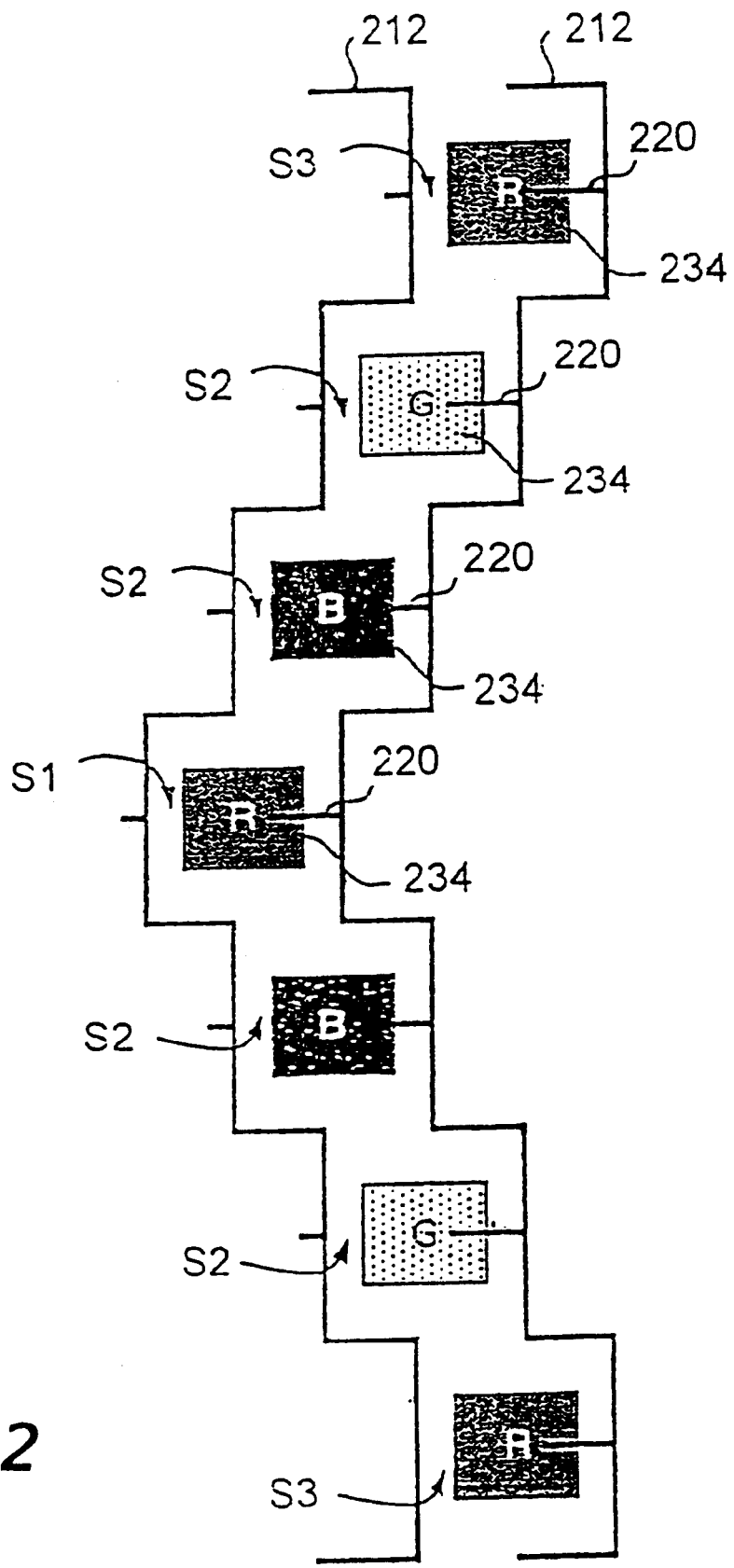
FIG. 2 is an enlarged plan view showing the pattern of sub-pixels in the liquid-crystal display device.

The type 5 shown in FIG. 1 is employed as a wiring pattern in this embodiment. Specifically, a single data line 212 is connected to the pixel electrodes 234 of the sub-pixels for the three colors of "R", "G", and "B" in a predetermined order in a periodic pattern through respective TFD 220, while the pixel electrodes 234, commonly connected to a single data line 212, are arranged to the same side of the data line 212 (to the left of the data line 212 as shown in FIG. 1). This arrangement is consistent throughout all data lines 212. The distance between the pixel electrodes 234 of the sub-pixels and the data line 212 on the left side of the pixel electrodes 234 in the present embodiment is maintained constant in every row as shown in FIG. 2. Specifically, let S3 represent the distance between the pixel electrode 234 and the data line 212 when the data line 212 extends along one side of the pixel electrode 234, let S2 represent the distance between the pixel electrode 234 and the data line 212 when the data line 212 surrounds the pixel electrode 234 in an L configuration, and let S1 represent the distance between the pixel electrode 234 and the data line 212 when the data line 234 surrounds the pixel electrode 234 by half the outline thereof, and the relationship S1=S2=S3 holds.

When the liquid-crystal driving ICs 250 and 350 operate in the liquid-crystal display device 100 thus constructed, an on voltage or an off voltage is applied across the pixel electrode 234 and the opposing electrode 312 in a selected sub-pixel, and the alignment state of the liquid crystal 105 is controlled by the applied voltage in each sub-pixel. Particular color light being transmitted through each sub-pixel is modulated in accordance with the alignment control. An image of texts, numerals, and figures is thus presented in color.

Figure 19:
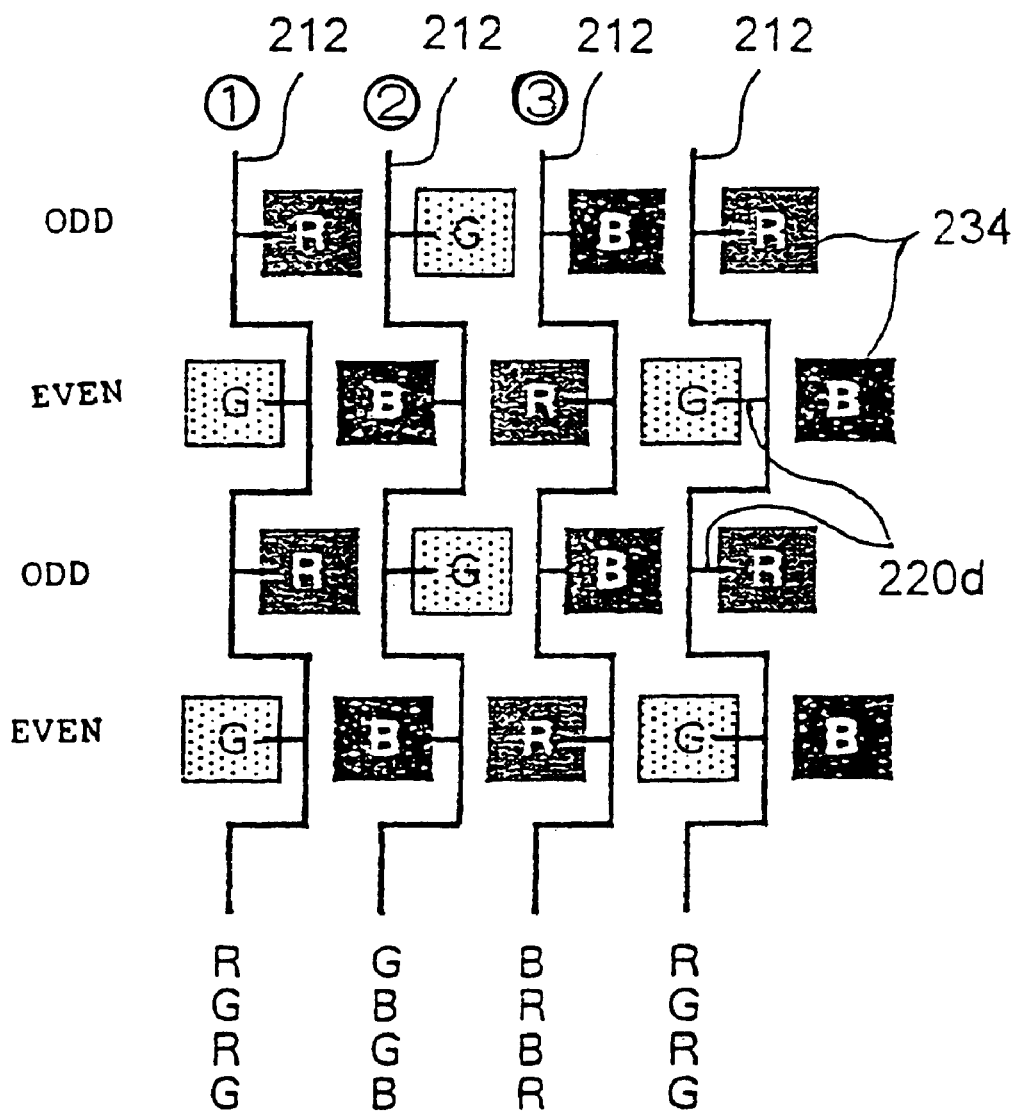
FIG. 19 is a plan view showing a wiring (type 1) in the RGB delta pattern.
Figure 20:
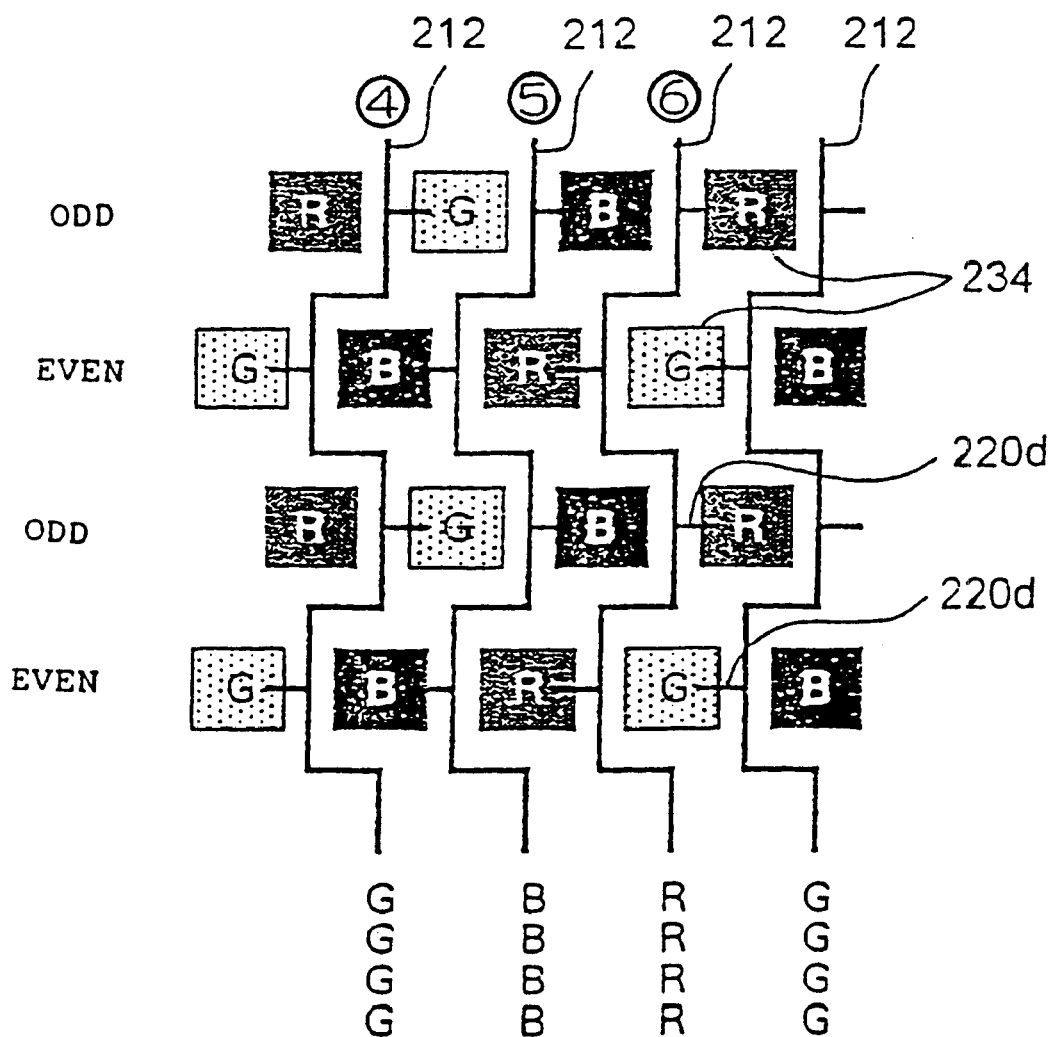
FIG. 20 is a plan view showing a wiring (type 2) in the RGB delta pattern.
Figure 21:
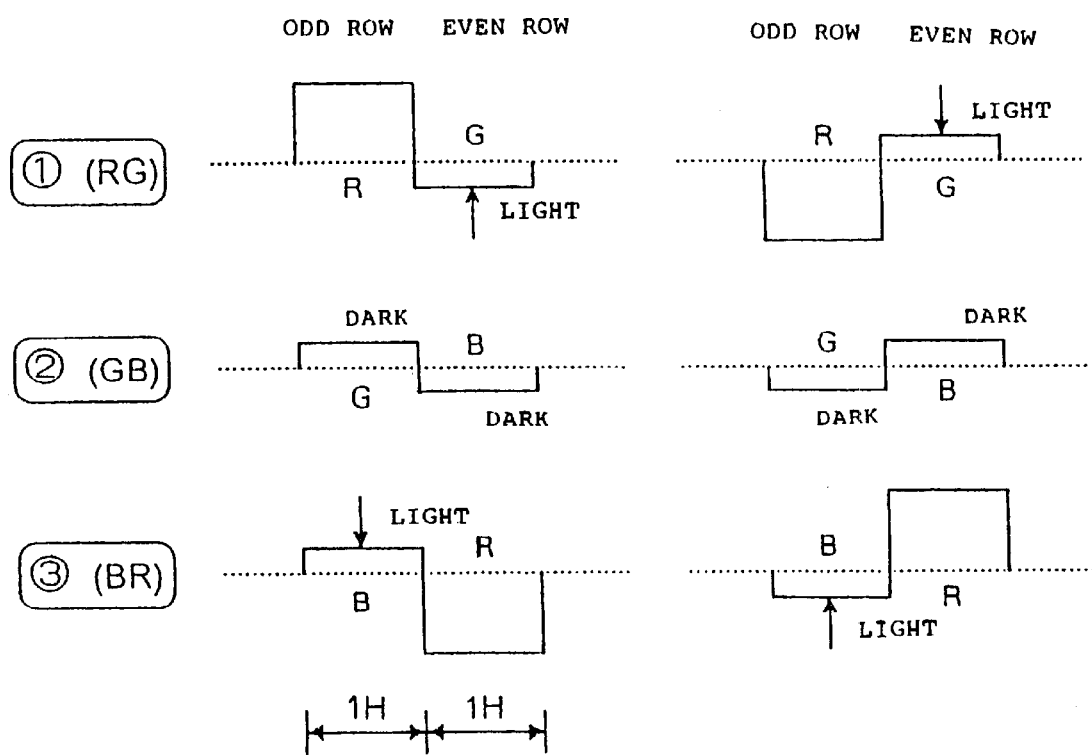
FIG. 21 is a waveform diagram showing an example of a drive signal in the liquid-crystal display device.
Figure 22:
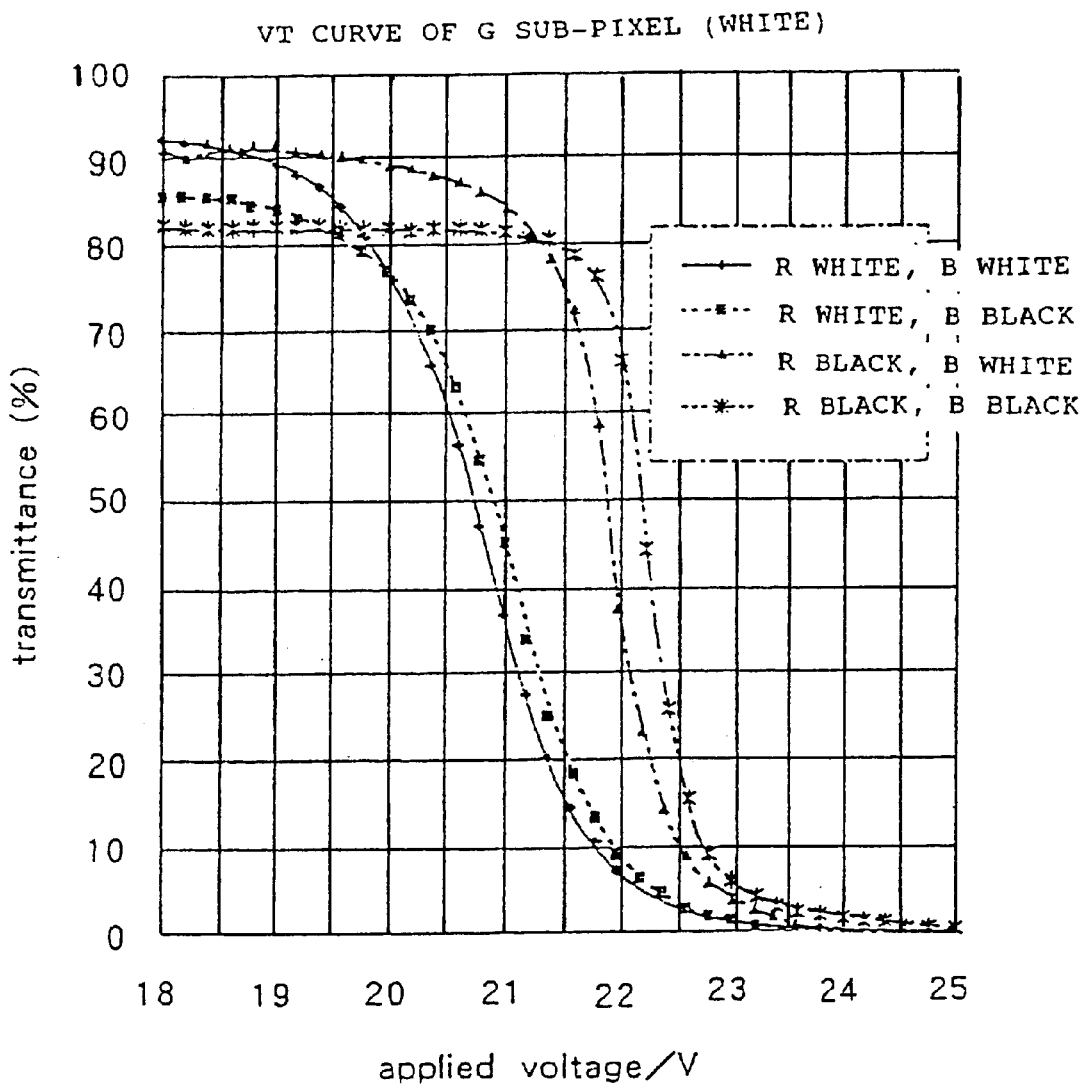
FIG. 22 is a graph showing a VT curve for a white display (off) in a sub-pixel for a particular color.
Figure 23:
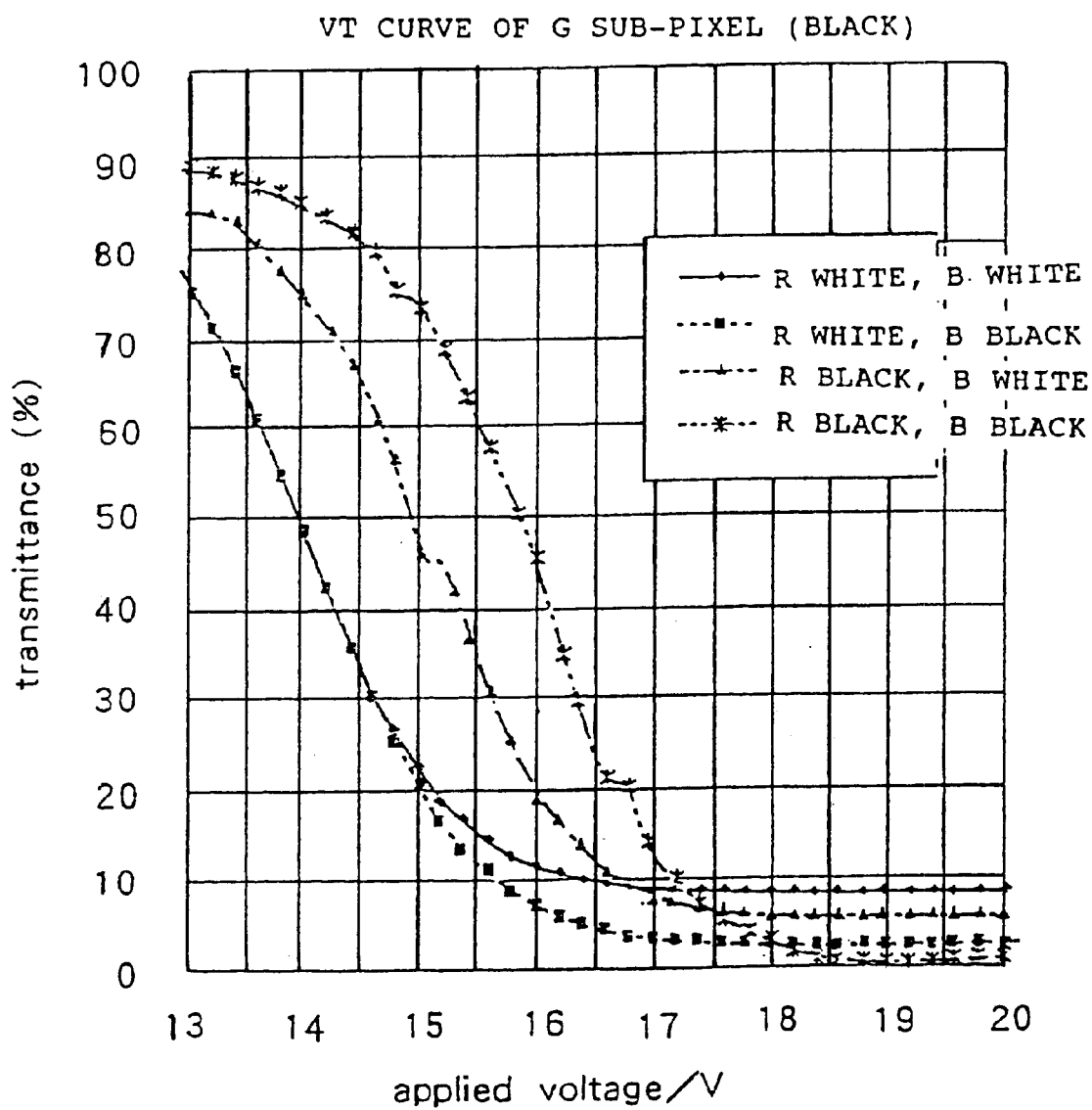
FIG. 23 is a graph showing a VT curve for a black display (on) in a sub-pixel for a particular color.
Figure 24:
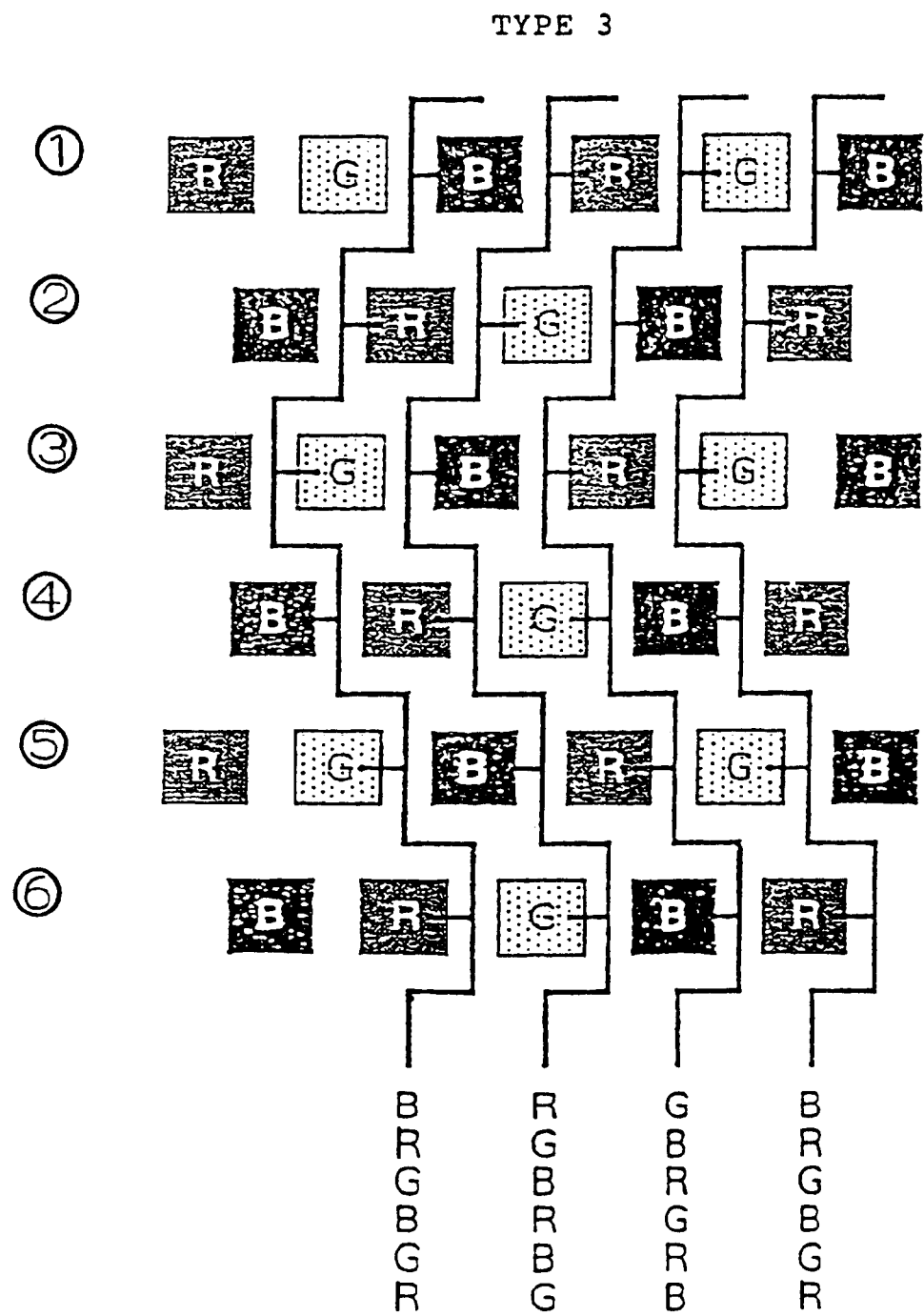
FIG. 24 is a plan view showing a wiring (type 3) in the RGB delta pattern.
Figure 25:
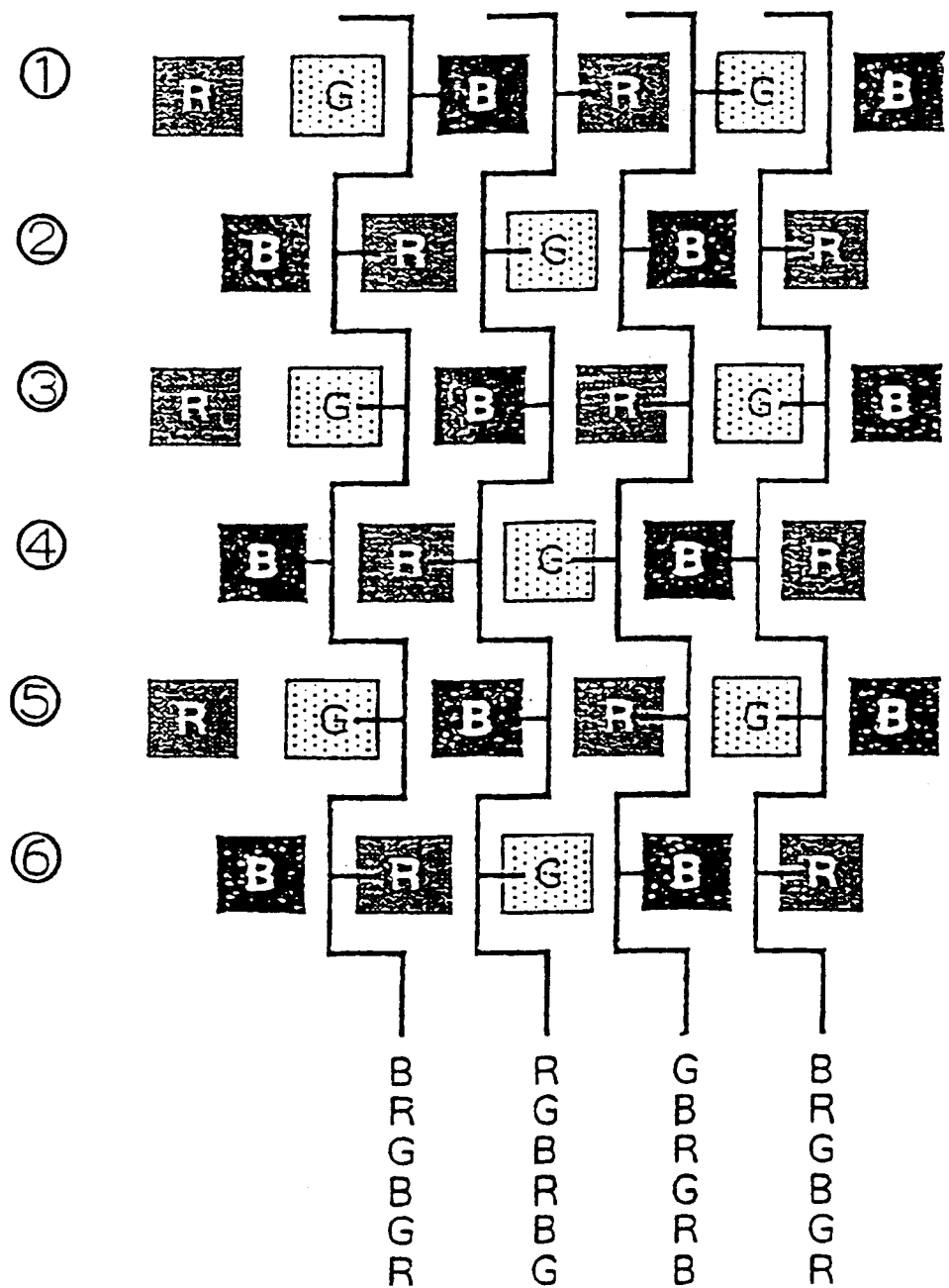
FIG. 25 is a plan view showing a wiring (type 4) in the RGB delta pattern.

With the color filter arranged in the RGB delta pattern, the liquid-crystal display device 100 presents a horizontal resolution higher than those obtained from the RGB stripe pattern, the RGB mosaic pattern, and the RGGB mosaic pattern. As a result, the liquid-crystal display device 100 presents a liquid-crystal display having a high definition and a high image quality. Since the present embodiment employs the wiring pattern in which a single data line 212 drives the sub-pixels for the three colors, the vertical cross-talk in the type 1 wiring pattern (see FIG. 19) is controlled, and a degradation in the image quality attributed thereto is avoided.

In the present invention, furthermore, any given sub-pixel is connected to the data line 212 positioned to the right thereof, and each sub-pixel is coupled with only the data line 212 positioned to the left thereof. For this reason, when the sub-pixels for the same color at each are observed, the colors of the sub-pixels driven by the data line 212 coupled with the sub-pixels remain the same in each row. The effect of the cross-talk on the sub-pixel for each color is uniform throughout the sub-pixels, and an excellent display quality free from the streak non-uniformity thus results.

Second Embodiment

In the above-referenced first embodiment, as shown in FIG. 1 and FIG. 2, there are three cases of routing the data line 212 around the pixel electrode 234, i.e., (1) the data line 212 extends along one side of the pixel electrode 234, (2) the data line 212 surrounds the pixel electrode 234 in an L configuration, and (3) the data line 212 surrounds the pixel electrode 234 by half the outline thereof.

In the case (3) in which the data line 212 surrounds the pixel electrode 234 by half the outline thereof, the coupling capacitance between the data line 212 and the pixel electrode 234 is large, and hence the effect of a variation in the potential of the data line 212 on the potential of the sub-pixel positioned to the right of the data line 212 is also large. In the case (1) in which the data line 212 extends along one side of the pixel electrode 234, the coupling capacitance between the data line 212 and the pixel electrode 234 is small, and hence the effect of a variation in the potential of the data line 212 on the potential of the sub-pixel positioned to the right of the data line 212 is also small. Since the effect of the variation in the potential of the data line 212 on the potential of the sub-pixel becomes different depending on the configuration of the data line 212 that surrounds the pixel electrode 234, the display quality is subject to degradation if the relationship of S1=S2=S3 is maintained.

Figure 6:
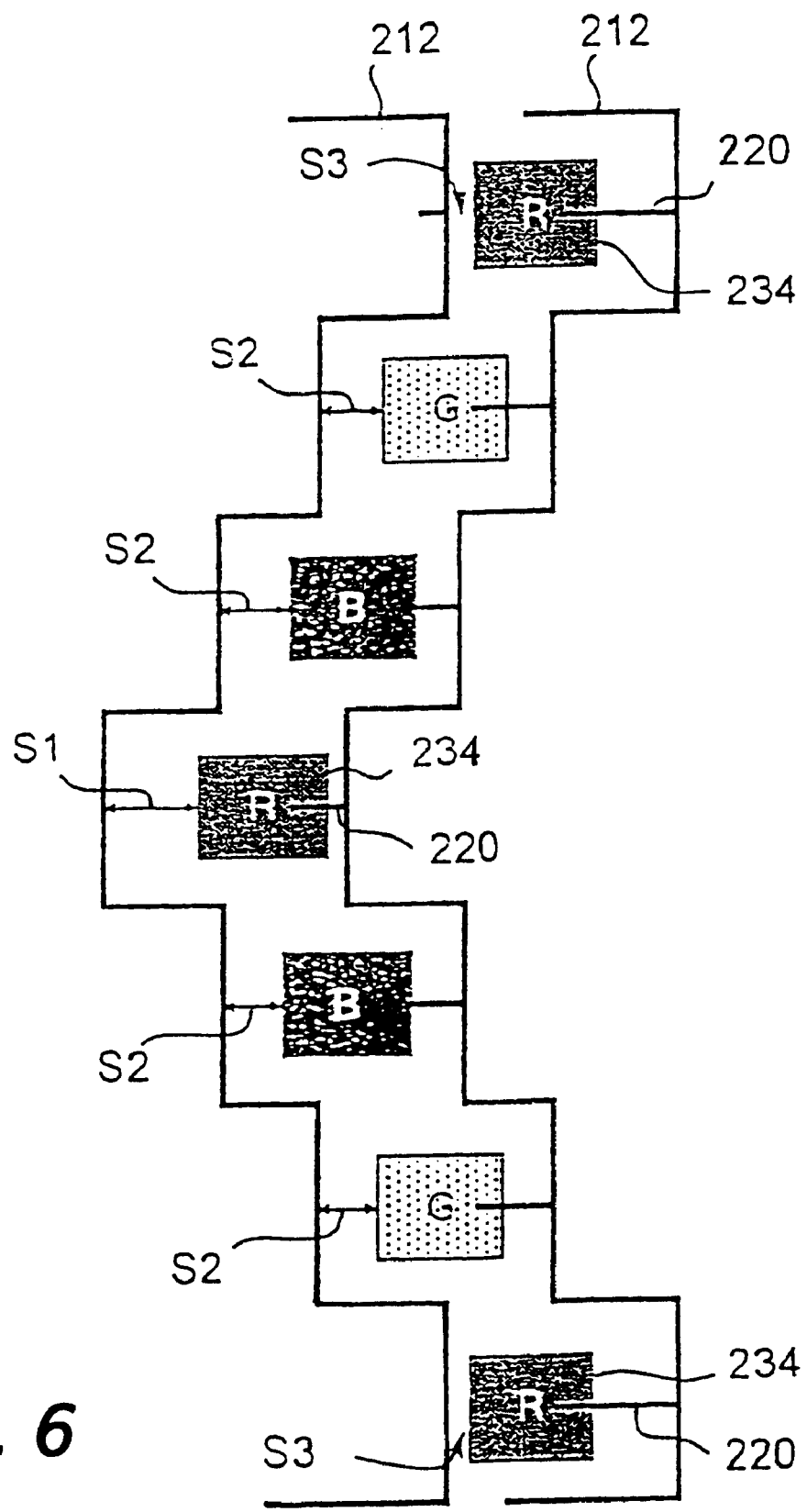
FIG. 6 is an enlarged plan view of the pattern of sub-pixels in the liquid-crystal display device of a second embodiment of the present invention.

To avoid this problem, a second embodiment of the present invention sets the relationship of S1, S2, and S3 to be S1>S2>S3 as shown in FIG. 6. Specifically, the distance S3 is set to be small in the case (1) in which the data line 212 surrounds the pixel electrode 234 by half the outline thereof, the distance S1 is set to be large in the case (3) in which the data line 212 extends along one side of the pixel electrode 234, and the distance S2 is set to be intermediate therebetween in the case (2) in which the data line 212 surrounds the pixel electrode 234 in an L configuration.

This arrangement equalizes in each row the parasitic capacitances created between the pixel electrodes 234 and the data lines 212 positioned to the left thereof, thereby preventing the display quality from being varied depending on the difference in the parasitic capacitances. The same advantage is achieved if the line width of the surrounding data line 212 is thinned as the length of a portion of the data line 212 extending along the data line 212 becomes long.

Third Embodiment

Figure 7:
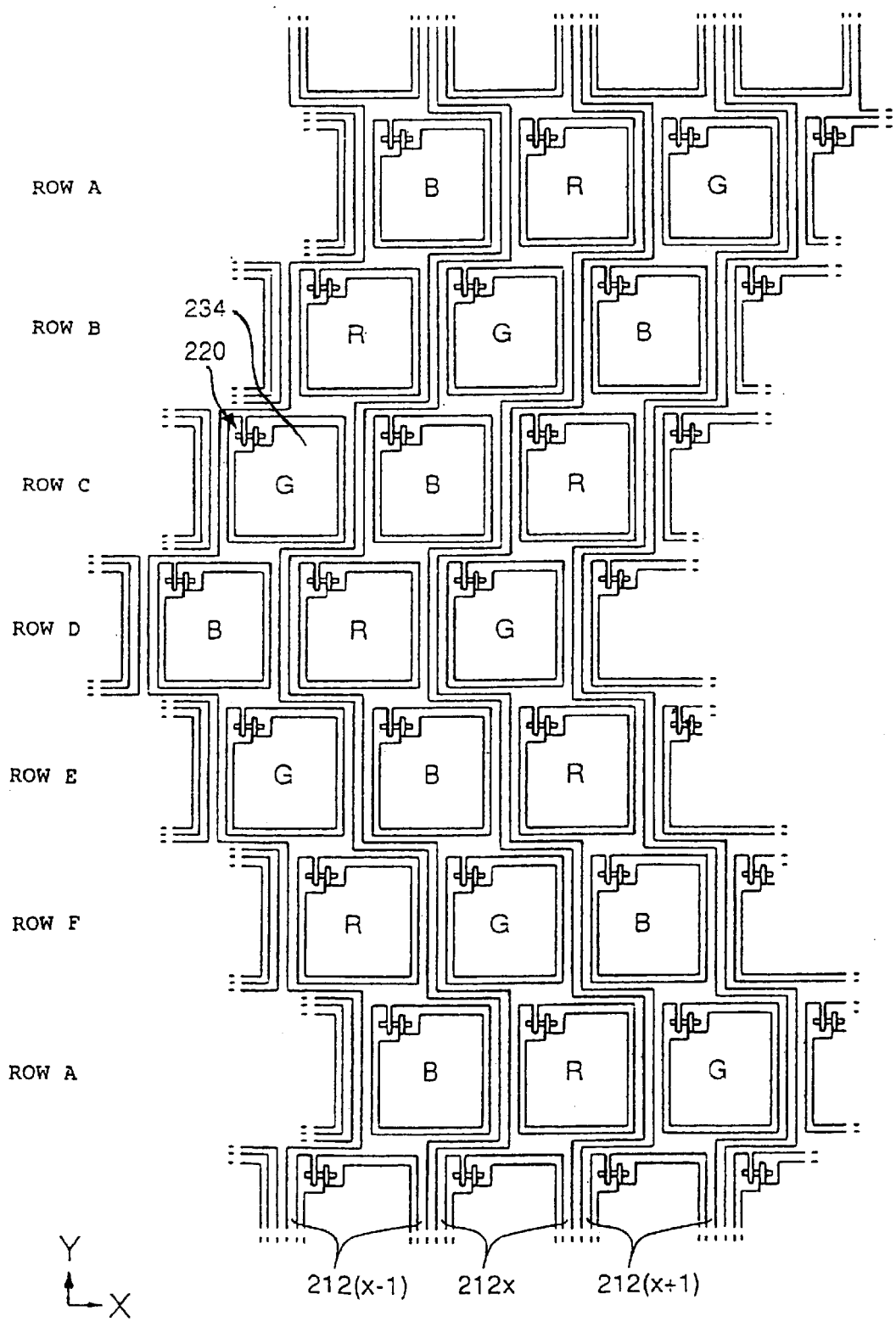
FIG. 7 is a plan view showing the layout of an element substrate in the liquid-crystal display device of a third embodiment of the present invention.

The liquid-crystal display device of a third embodiment of the present invention is now discussed. The liquid-crystal display device of the third embodiment remains unchanged from the first embodiment in the construction shown in FIGS. 3 and 4, but is different therefrom in the layout of the element substrate 200. The following discussion focuses on the difference therebetween. FIG. 7 is a plan view showing the layout of the element substrate 200 in the liquid-crystal display device.

The pixel electrodes for "R", "G", and "B" are arranged in an RGB delta pattern like in the first embodiment as shown. The pixel electrodes 234 in an A row are shifted from the pixel electrodes 234 in a B row by 0.5 pitch in the direction of rows (in the X direction as shown).

A single data line 212x is routed from the R sub-pixel in the A row to the R sub-pixel in the D row downwardly and leftwardly, and then is routed to the R sub-pixel in another A row downwardly and rightwardly as shown. The data line 212x thus extends across the A row through the F row in the direction of columns in a pattern which is repeatedly folded with a period of six pixels. The data line 212x is thus commonly shared by a single column of the pixel electrodes 234, if viewed macroscopically. The data line 212X thus surrounds each of the pixel electrodes 234, and is connected to the pixel electrodes 234 through respective TFD 220.

Now discussed is one sub-pixel connected to the data line 212x in the B row or C row. FIG. 8A is a plan view showing the layout of the one sub-pixel, and FIG. 8B is a cross-sectional view taken along line A—A in FIG. 8A. As shown, TFD 220 is composed of a first TFD 220a and a second TFD 220b, and includes a element substrate 200, an insulator 201 deposited on the element substrate 200, a first metallic layer 222, an oxide layer 224, as an insulator, which is formed by anodizing the surface of the first metallic layer 222, and mutually separated, second metallic layers 226a and 226b formed on the oxide layer 224. The second metallic layer 226a serves as a data line 212x, while the second metallic layer 226b is connected to the pixel electrode 234.

The first TFD 220a is fabricated of the second metallic layer 226a/the oxide layer 224/the first metallic layer 222, if viewed from the side of the data line 212x, and is provided with diode switching characteristics with the sandwich metal/insulator/metal structure thereof. On the other hand, the second TFD 220b is fabricated of the first metallic layer 222/the oxide layer 224/the second metallic layer 226b, if viewed from the side of the data line 212x, and has diode switching characteristics opposite from those of the first TFD 220a. Since the two diodes are here connected in series in mutually opposite directions, the non-linear current-voltage characteristics thereof are made symmetrical with respect to the positive-negative direction.

Although data line 212x includes the first metallic layer 222, the oxide layer 224, and the second metallic layer 226a in the cross section thereof, the data line 212x does not function as a TFD because the top second metallic layer 226a only is connected to the data line 212x.

The substrate 200 itself has insulation and transparency, and is typically formed of glass or plastic. The insulator 201 is arranged so that the first metallic layer 222 is not peeled off the substrate through the heat treatment thereof prior to the deposition of the first metallic layer 222 and so that no impurities diffuse into the first metallic layer 222 through the heat treat. If these are not concerns, the insulator 201 is dispensed with. When the pixel electrodes 234 are used as a transmissive type, the pixel electrodes 234 are fabricated of a transparent electrically conductive layer such as an ITO (Indium Tin Oxide) film, and when the pixel electrodes 234 are used as a reflective type, the pixel electrodes 234 are fabricated of a metallic layer, such as of aluminum or silver, having a large reflectance.

The above discussion of the sub-pixel in the B row or the C row is also true of the sub-pixels in the E row and the F row, except that the portion of data line 212x surrounding the sub-pixel becomes symmetrical, and is also true of the sub-pixels in the A row and the D row except that the upper half or the lower half of the portion of the data line 212 surrounding the sub-pixel is symmetrical.

Figure 9:
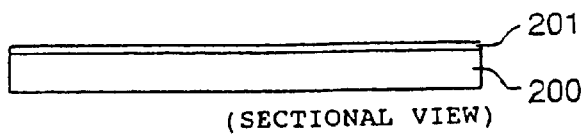
FIG. 9 shows a manufacturing process of a TFD in the liquid-crystal display device.
Figure 9:
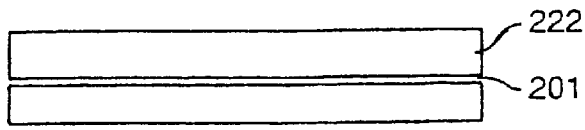
Figure 9:
Figure 9:
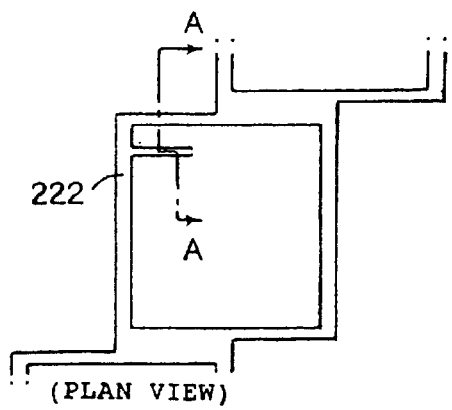
Figure 9:
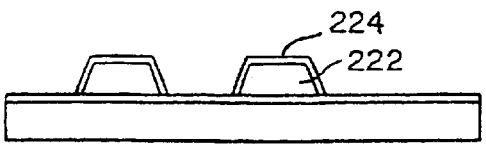
Figure 9:
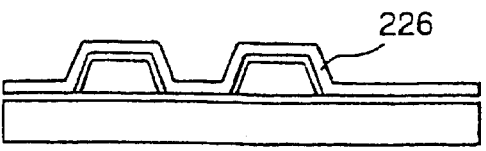

The manufacturing process of the element substrate 200 is now discussed, focusing on TFD 220. Referring to FIG. 9(1), the insulator 201 is deposited on the substrate 200. The insulator 201 is fabricated of tantalum oxide, for instance, and is deposited using a method of thermally oxidizing a tantalum film deposited through sputtering technique or sputtering or cosputtering technique using a target made of tantalum oxide. Since the insulator 201 is arranged chiefly to improve the bond of the first metallic layer 222 and to prevent impurity diffusion from the substrate 200, as already discussed, the thickness thereof within a range of 50 to 200 nm is sufficient.

Referring to FIG. 9(2), the first metallic layer 222 is deposited on the insulator 201. The composition of the first metallic layer 222 is tantalum alone, or a tantalum-based alloy. When the tantalum-based alloy is used, tantalum, as main component, is added with one of the elements belonging to group VI through group VIII, such as tungsten, chromium, molybdenum, rhenium, yttrium, lanthanum, or dysprosium. An element to be added is preferably tungsten, and the content thereof is preferably within a range of 0.1 to 6 weight percent.

The first metallic layer 222 can be formed using the sputtering technique or electron-beam deposition. To form the first metallic layer 222 made of the tantalum alloy, the sputtering technique using combination targets, cosputtering technique or electron-beam deposition may be used. The thickness of the first metallic layer 222 is appropriately set in view of the application of TFD 220, and is typically within a range of 100 to 500 nm.

Referring to FIG. 9(3), the first metallic layer 222 is patterned using typical photolithographic and etching technique.

In succession, referring to FIG. 9(4), the oxide layer 224 is deposited on the first metallic layer 222. Specifically, the surface of the first metallic layer 222 is anodized for oxidization. At the same time, the portion of the first metallic layer 222 serving as the underlayer for the data line 212x is also oxidized, forming the oxide layer 224. The thickness of the oxide layer 224 is appropriately set in view of the application thereof, and may be within a range of 10 to 35 nm, for instance, and is half as thick as that in the case in which a single TFD is employed in one pixel. A solution employed in the anodization is not limited to a particular one, but a citrate solution having a concentration of 0.01 to 0.1 weight percent may be used.

Referring to FIG. 9(5), the second metallic layer 226 is deposited. The second metallic layer 226 may be made of chromium, aluminum, titanium, or molybdenum, and is deposited through the sputtering technique. The thickness of the second metallic layer 226 is within a range of 50 to 300 nm, for instance.

Figure 10:
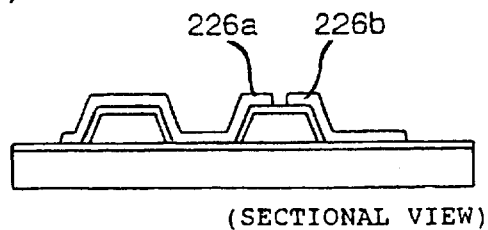
FIG. 10 shows a manufacturing process of the TFD in the liquid-crystal display device.
Figure 10:
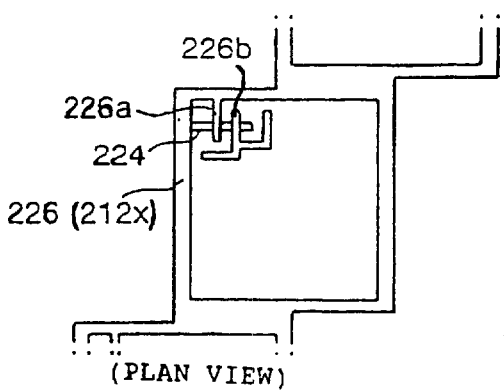
Figure 10:
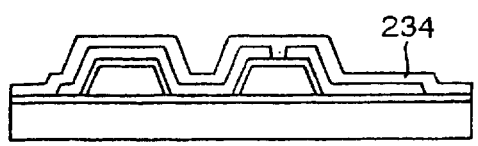
Figure 10:
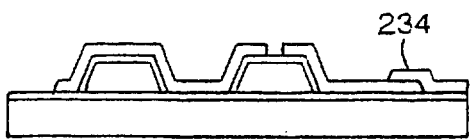
Figure 10:
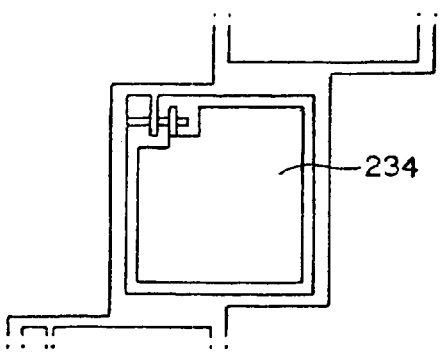
Figure 10:
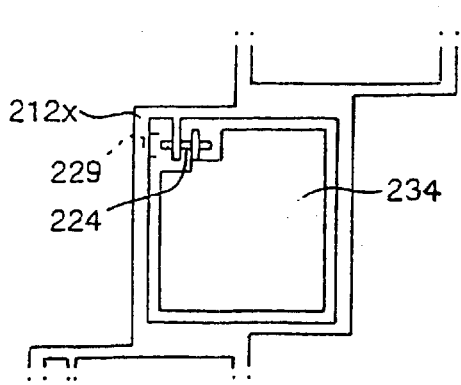

Referring to FIG. 10(6), the second metallic layer 226 is patterned using typical photolithographic and etching technique. In this way, the first and second metallic layers 226a and 226b in the first and second TFDs are formed to be separate, and the top layer of the data line 212x is covered with the second metallic layer 226.

Referring to FIG. 10(7), an electrically conductive layer to become the pixel electrode 234 is deposited. ITO is best suited for the electrically conductive layer in the transmissive type liquid-crystal display device, and aluminum is best suited in the reflective type liquid-crystal display device. In both cases, the electrically conductive layer is deposited to a thickness of 30 to 200 nm using the sputtering technique.

Referring to FIG. 10(8), the electrically conductive layer is patterned using typical photolithographic and etching technique to form the pixel electrodes 234.

Referring to FIG. 10(9), a portion 229 of the oxide layer 224 shown in dotted lines and branched from the data line 212x and the first metallic layer 222 serving as the underlayer therefor are together removed using typical photolithographic and etching technique. In this way, the first metallic layer 222, shared by the first and second TFDs, is electrically isolated from the first metallic layer 222 which is the bottom layer of the data line 212x.

Through the manufacturing process, TFD 200, composed of the first TFD 220a and the second TFD 220b, is formed on the substrate 200 along with the pixel electrode 234 in a delta pattern.

The manufacturing process of the TFD is not limited to the order of the steps described above. For instance, the first metallic layer 222 is separated from the data line 212x in the step shown in FIG. 10(9), immediately subsequent to the formation of the oxide layer 224 on the first metallic layer 222 in the step shown in FIG. 9(4), and the step shown in FIG. 9(5) and steps shown in FIG. 10(6) through FIG. 10(8) are then performed.

The element substrate 200 thus constructed is attached to the opposing substrate 300 which has the opposing electrodes (scanning lines) extending in the direction of rows and in alignment with the pixel electrodes 234, and the color filter having the color layers respectively corresponding to the pixel electrodes 234. The element substrate 200 and the opposing substrate 300 are glued together using a sealing material with a gap (space) maintained therebetween. A TN (Twisted Nematic) type liquid crystal, for instance, is encapsulated into this closed space to complete the liquid-crystal display device.

Since the pixel electrode 234 connected to the data line 212x is surrounded by the data line 212x itself in the liquid-crystal display device of the third embodiment, the influence of the adjacent data line 212(x−1) or 212(x+1) is eliminated. In other words, only the coupling of the pixel electrode 234 with its own data line 212x is a problem. The same is true of the adjacent data lines 212(x−1) and 212(x+1). Since the liquid-crystal display device has equal parasitic capacitances of the sub-pixels positioned in the A through F rows, a uniform display image quality results.

Fourth Embodiment

The liquid-crystal display device of a fourth embodiment of the present invention is now discussed.

Since the pixel electrode 234 is surrounded by its own data line connected thereto in the third embodiment, the coupling capacitance with the adjacent data lines is not a problem. The third embodiment is excellent from the standpoint of providing a uniform display image. Referring to FIG. 8A, however, two data lines, i.e., a line L1 for the data line 212x and a line L2 of the data line 212(x+1) adjacent thereto, are arranged between two adjacent pixel electrodes 234, leading to problems that the possibility of shorts becomes high in the above-discussed patterning step of the first metallic layer 222 and in the patterning step of the second metallic layer 226, and that the entire display screen becomes dark as a result of a drop in the ratio of occupation by the pixel electrode 234 (aperture ratio).

Now discussed here is the fourth embodiment which equalizes the parasitic capacitances of the pixel electrodes in each row and is further free from the problems of shorts and aperture ratio associated with the third embodiment.

Figure 11:
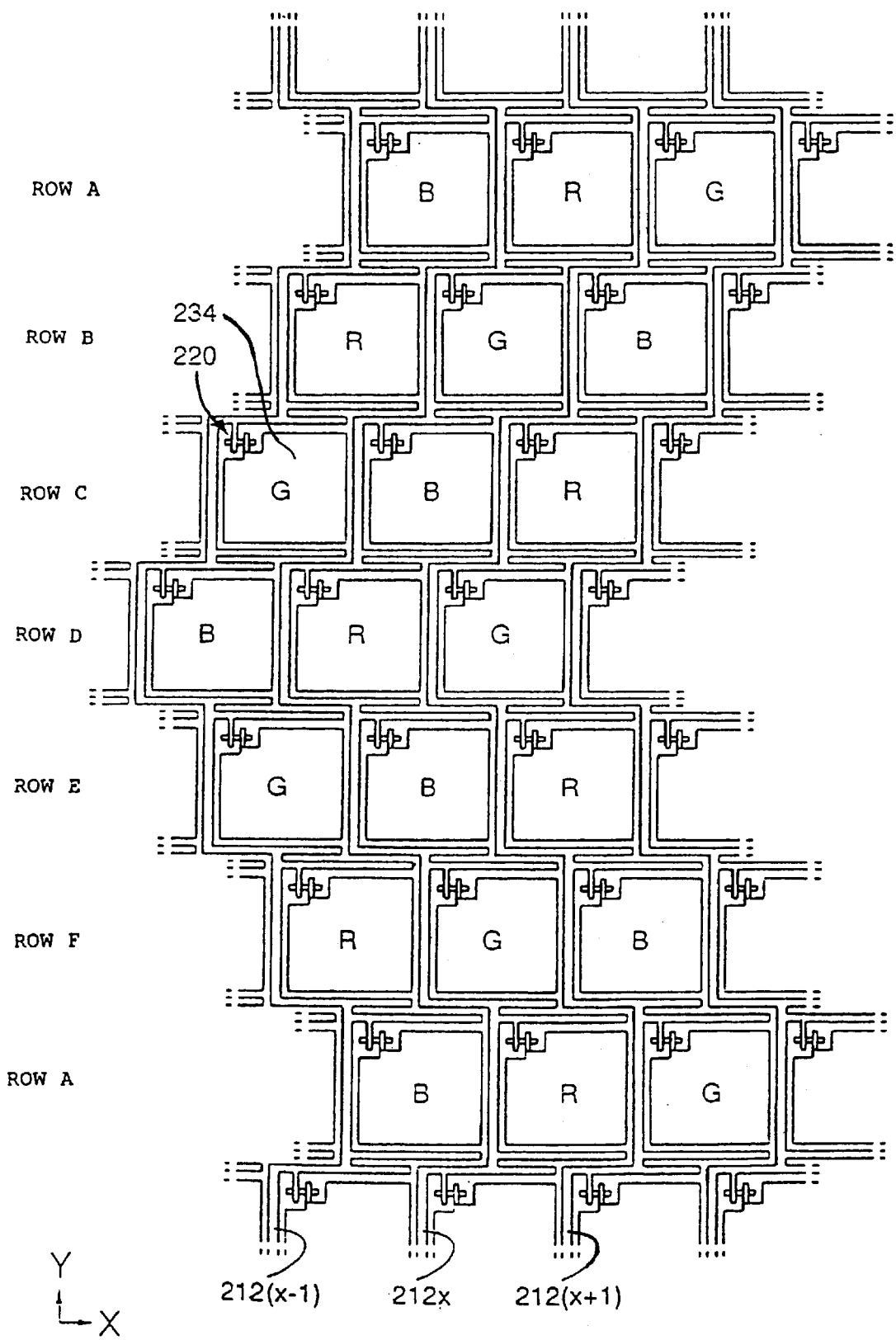
FIG. 11 is a plan view showing the layout of an element substrate in the liquid-crystal display device of a fourth embodiment of the present invention.

FIG. 11 is a plan view showing the layout of the element substrate 200 in the liquid-crystal display device. As shown, the fourth embodiment is identical to the first and third embodiment in that the pixel electrodes 234 for "R", "G", and "B" are arranged in an RGB delta pattern. The fourth embodiment is different from the third embodiment in that the pixel electrode is surrounded by the same width data line along the three sides thereof other than the side facing the adjacent data line, rather than all sides thereof.

Figure 12A:
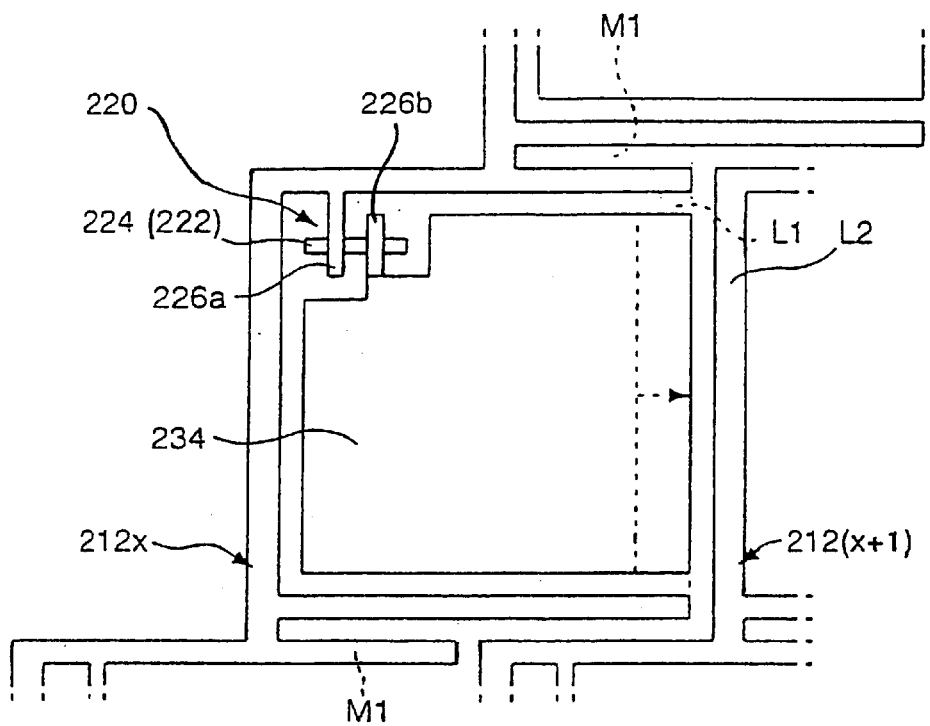
FIG. 12A is an enlarged view partially showing the layout of a single pixel in the liquid-crystal display device.

Now discussed is one sub-pixel connected to the data line 212x in the B row or C row. FIG. 12A is a plan view showing the layout of the one sub-pixel.

As shown, the line L1 and area M1 are removed in the one sub-pixel in the second embodiment in FIG. 8A, and the pixel electrode 234 extends to where the line L1 was there as shown by an arrow. Since an adjacent data line (line L2) only is arranged between adjacent pixel electrodes 234, the possibility of shorts in the patterning step is reduced.

With the spacing between the sub-pixels maintained, the area of the pixel electrode 234 increases, thereby increasing the aperture ratio.

Figure 12B:
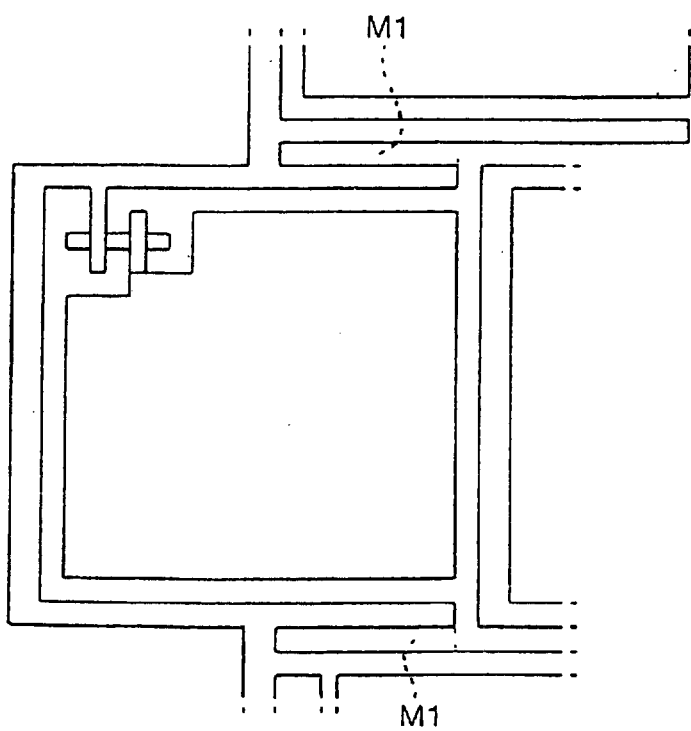
FIG. 12B is an enlarged view partially showing the layout of a single pixel in the liquid-crystal display device.

The elimination of the area M1 does not directly lead to the prevention of shorts and the increase in the aperture ratio. If the area M1 is not eliminated, the width of the data line 212 surrounding the pixel electrode 234 fails to become consistently uniform. The area M1 for the sub-pixel in the B row or the C row as shown in FIG. 12A and the area M1 for the sub-pixel in the D row as shown in FIG. 12B become different from each other. The parasitic capacitances become different from row to row. For this reason, the area M1 is eliminated.

In this arrangement, the pixel electrode 234 in each row is surrounded by the data line having the same width, and the remaining one side only is coupled with an adjacent data line. The parasitic capacitances are thus equalized. The liquid-crystal display device of the fourth embodiment present a uniform display image while preventing shorts and a drop in the aperture ratio.

In the liquid-crystal display devices of the third and fourth embodiments, TFD 220 is connected to the data line. The same advantages are achieved even if TFD 220 is connected to the scanning line.

In the liquid-crystal display devices of the third and fourth embodiments, TFD 220 is composed of the first TFD 220*a* and the second TFD 220*b* connected in opposite directions in series. Alternatively, a single TFD works.

In the liquid-crystal display devices of the above-referenced embodiments, the second metallic layer 226 and the pixel electrode 234 are fabricated of different metal films. Alternatively, the second metallic layer and the pixel electrode may be fabricated of the same electrically conductive material, such as ITO film or aluminum film. Such an arrangement permits the second metallic layer 226 and the pixel electrode 234 to be produced in the same manufacturing step.

In the liquid-crystal display devices of the first through fourth embodiments, the data line 212 is routed in a pattern that is repeatedly folded with a period of six sub-pixels. The pattern may be repeatedly folded with a period of multiple of six sub-pixels, for instance, 12 sub-pixels, 18 sub-pixels, . . . If the number of sub-pixels per one period is too many in the folded pattern, however, the overextension of the data line at the edge of the display area disadvantageously becomes large.

Besides TFD 220, a three-terminal element such as TFT may be used for the active element. The order of the colors presented by the sub-pixels is not limited to the one described in connection with the embodiments. It is sufficient if the colors are cycled through with a period of multiple of six in each line.

Electronic Equipment

Electronic equipment incorporating the liquid-crystal display device of one of the above-referenced embodiments is now discussed.

Mobile Computer

Figure 13:
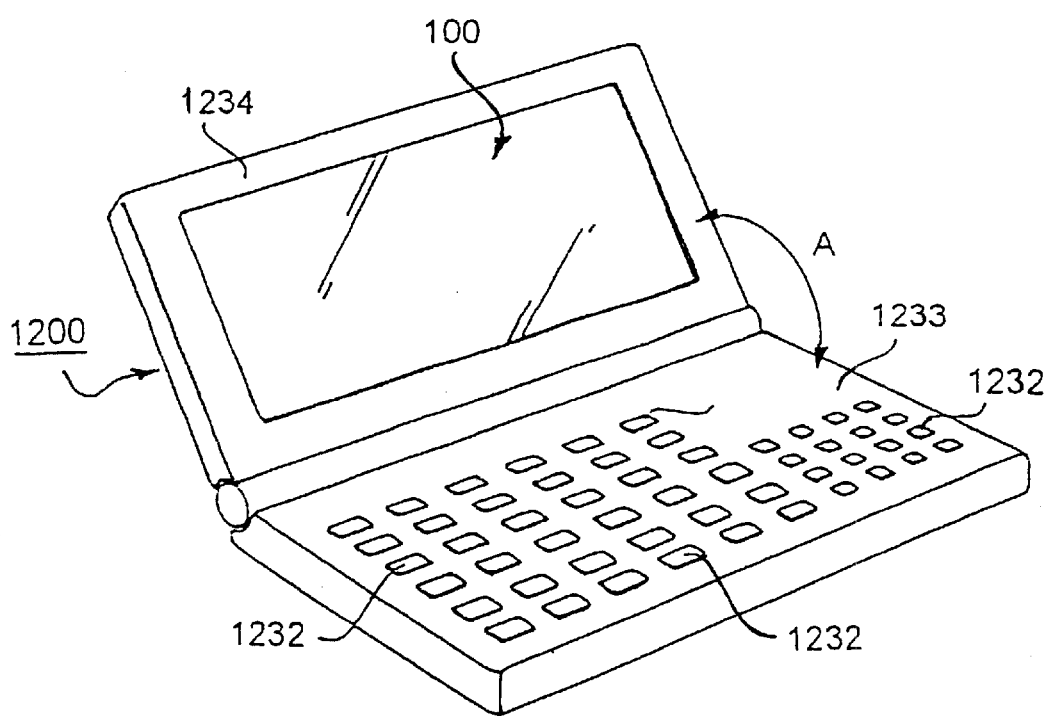
FIG. 13 is an exploded perspective view showing the construction of a personal computer, as an example of electronic equipment, in which the liquid-crystal display device of the embodiment of present invention is incorporated.

A mobile computer incorporating the liquid-crystal display device is now discussed. FIG. 13 is a perspective view of the construction of the mobile computer. As shown, the mobile computer 1200 includes a keyboard 1233 having a plurality of keys 1232, a cover 1234 openable in the directions shown by arrows A with respect to the keyboard 1233, and a liquid-crystal display device 100 embedded in the cover 1234. The liquid-crystal display device 100 is the liquid-crystal display device shown in FIG. 3 or FIG. 4 with a back light and other accessories attached thereto.

The keyboard 1233 houses therewithin a control unit including a CPU (Central Processing Unit) for performing a diversity of computations for carrying out functions required of the mobile computer. The control unit performs computations to present a required image on the liquid-crystal display device 100.

With the liquid-crystal display device 100 in accordance with one of the above embodiments incorporating in the display unit thereof, the mobile computer 1200 presents a liquid-crystal display having a high definition and a high image quality, and avoids a drop in the display quality attributed to the vertical cross-talk and the horizontal cross-talk.

Pager

Figure 14:
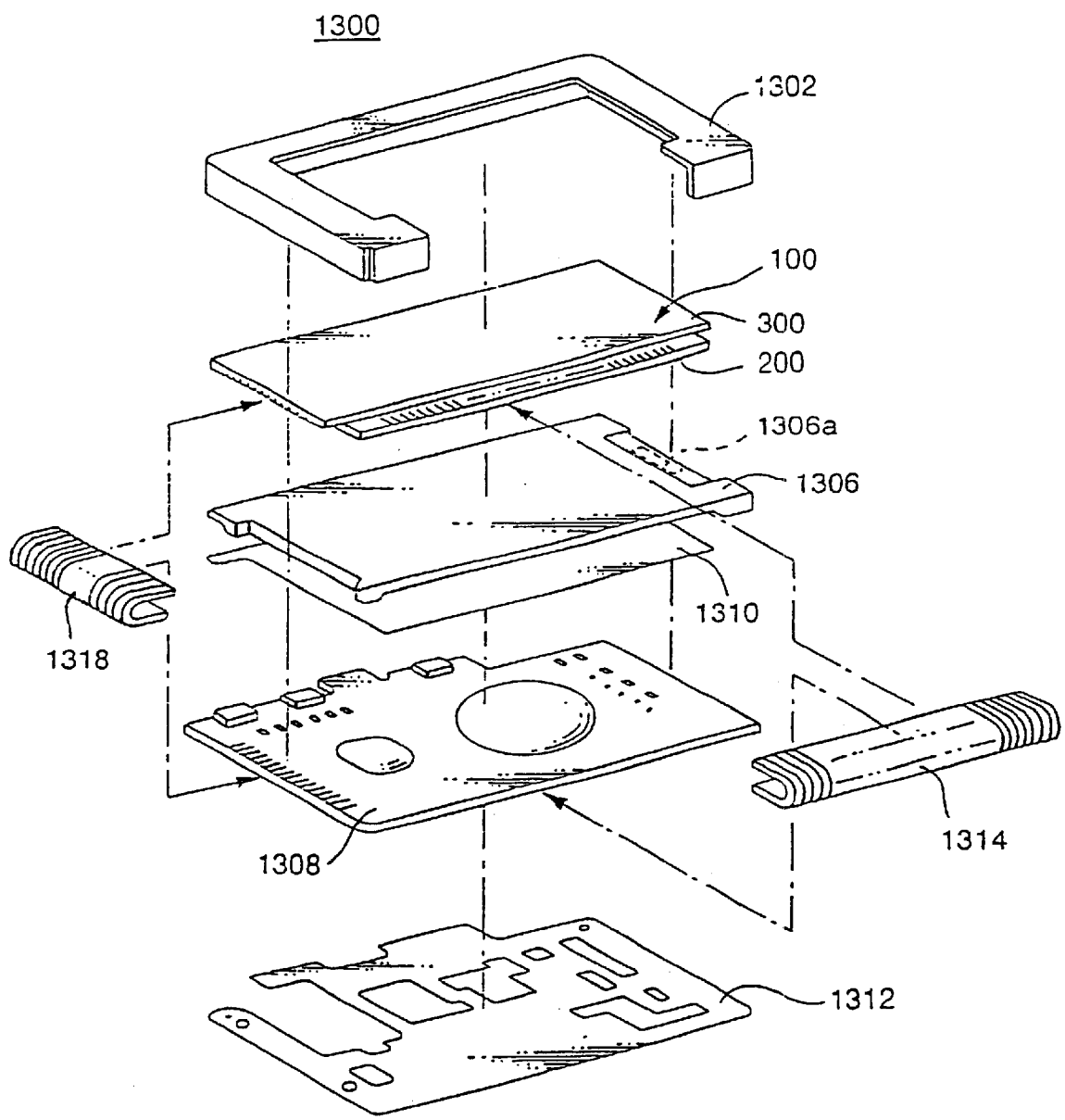
FIG. 14 is an exploded perspective view showing the construction of a pager, as an example of the electronic equipment, in which the liquid-crystal display device of the embodiment of present invention is incorporated.
Figure 15:
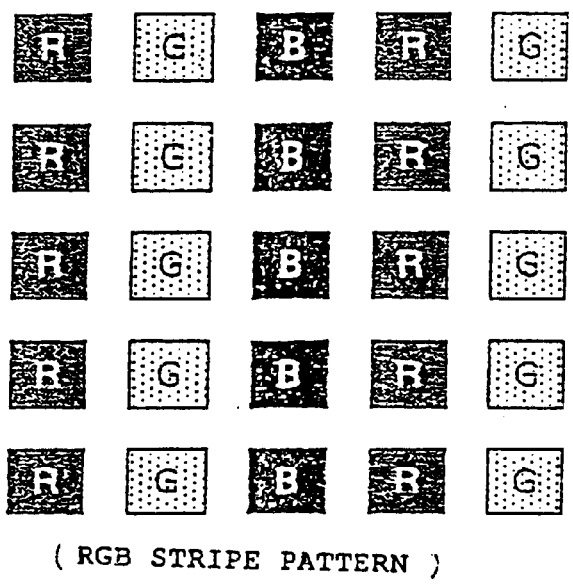
FIG. 15 is a plan view showing an RGB stripe pattern.
Figure 16:
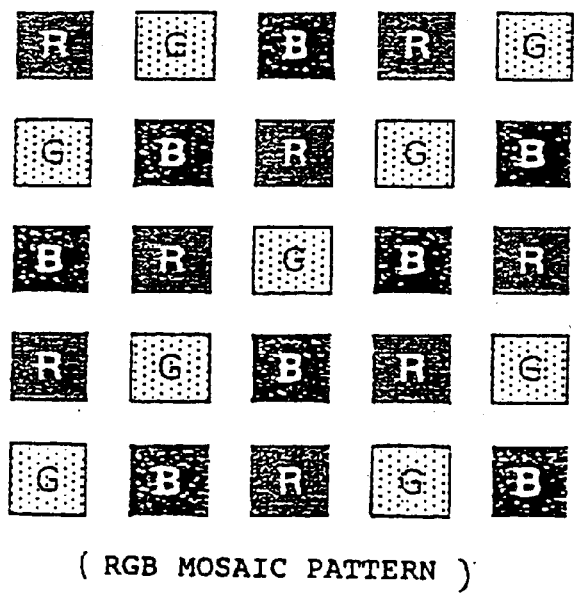
FIG. 16 is a plan view showing an RGB mosaic pattern.
Figure 17:
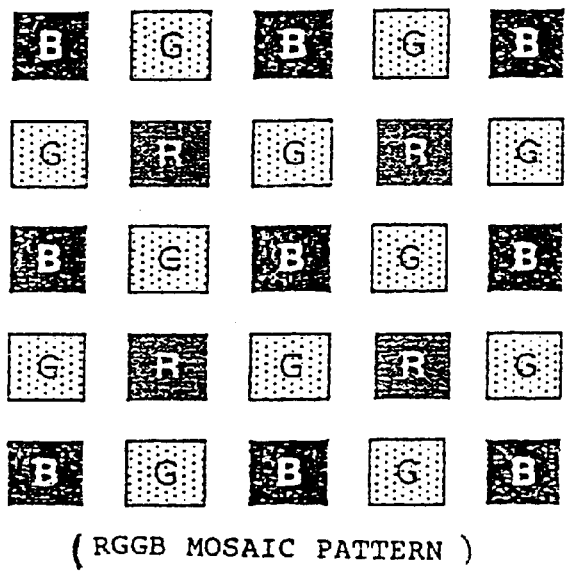
FIG. 17 is a plan view showing an RGGB mosaic pattern.
Figure 18:
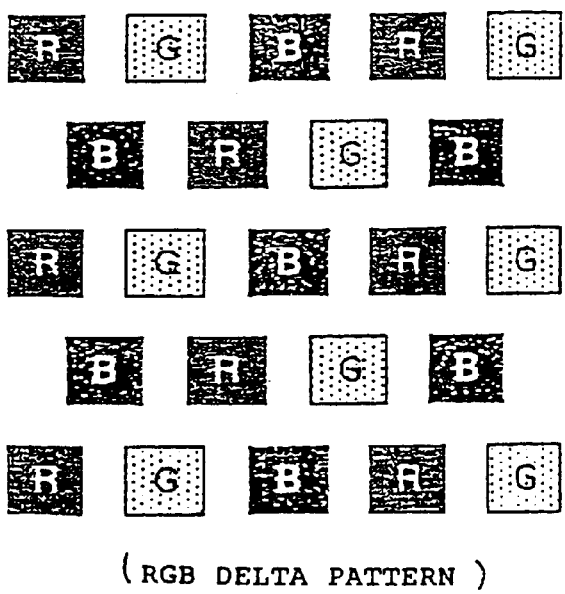
FIG. 18 is a plan view showing an RGB delta pattern.

A pager incorporating the liquid-crystal display device is now discussed. FIG. 14 is an exploded perspective view showing the construction of the pager. As shown, the pager 1300 houses, within a metallic frame 1302, a liquid-crystal display device 100 together with a light guide 1306 including a back light 1306*a*, a printed board 1308, and first and second shield plates 1310 and 1312. To connect the liquid-crystal display device 100 to the printed board 1308, a film tape 1314 is used for the connection of the element substrate 200 and a film tape 1318 is used for the connection of the opposing substrate 300.

Besides the electronic equipment shown in FIG. 13 and FIG. 14, examples of the electronic equipment may be a liquid-crystal display television, viewfinder type, direct-monitor viewing type video tape recorder, car navigation system, electronic pocketbook, electronic calculator, wordprocessor, workstation, portable telephone, video phone, POS terminal, and apparatus having a touch panel. The liquid-crystal display devices of the above embodiments may be incorporated in these pieces of electronic equipment.

The present invention is not limited to the above-referenced embodiments, and a variety of modifications is possible within the scope of the present invention as specified by the claims.

What is claimed is:

1. A liquid-crystal display device having sub-pixels, respectively corresponding to three different colors and arranged in a triangular configuration, characterized in that a conductor line for applying a voltage to the sub-pixels is connected to pixel electrodes of the sub-pixels respectively corresponding to the three colors in a fixed order, in a cyclic pattern, and pixel electrodes commonly connected to a single conductor line are arranged on the same side of the conductor line, wherein the conductor line is connected to the pixel electrodes in a pattern having a cycle of a multiple of six pixel electrodes, a pattern of the colors corresponding to the sub-pixels has a cycle of a multiple of six, and the conductor line is spaced apart from each pixel electrode by pre-selected distances, the distance from at least one pixel electrode is longer than the distance form the other pixel electrodes.

2. A liquid-crystal display device according to claim 1 wherein the conductor line is a data line being spaced apart from each pixel electrode by one of a plurality of pre-selected distances, each pre-selected distance corresponding to a length of the data line extending along each pixel electrode.

3. A liquid-crystal display device according to claim 1, characterized in that the conductor line is connected to each pixel electrode through an active element.

4. A liquid-crystal display device according to claim 3, characterized in that the active element is a thin-film diode having a conductor/insulator/conductor structure.

5. Electronic equipment comprising a liquid-crystal display device having sub-pixels, respectively corresponding to three different colors and arranged in a triangular configuration, characterized in that a conductor line for applying a voltage to the sub-pixels is connected to pixel electrodes of the sub-pixels respectively corresponding to the three colors in a fixed order in a periodic pattern, and pixel electrodes commonly connected to a single conductor line are arranged on the same side of the conductor line, wherein the conductor line is connected to the pixel electrodes in a pattern having a period of a multiple of six pixel electrodes, wherein a pattern of the colors corresponding to the sub-pixels has a period of a multiple of six.

6. A liquid-crystal display device according to claim 1 wherein the conductor line is formed so that parasitic capacitances thereof with the pixel electrodes of the sub-pixels are equalized among the sub-pixels.

7. Electronic equipment comprising a liquid-crystal display device according to claim 5 wherein the conductor line is formed so that parasitic capacitances thereof with the pixel electrodes of the sub-pixels are equalized among the sub-pixels.

8. A liquid-crystal display device according to claim 2, wherein said plurality of pre-selected distances further comprise:
- a shortest distance for pixel electrodes bordered only along one side by the data line;
- an intermediate distance for pixel electrodes bordered only along two adjacent sides by the data line; and
- a longest distance for pixel electrodes bordered along three adjacent sides by the data line.

* * * * *